US011271842B2

(12) United States Patent
Menon

(10) Patent No.: US 11,271,842 B2
(45) Date of Patent: **\*Mar. 8, 2022**

(54) ENHANCING TRANSMISSION CONTROL PROTOCOL (TCP) PERFORMANCE AND SCALABILITY ON MULTICORE PROCESSOR ARCHITECTURES

(71) Applicant: Spirent Communications, Inc., San Jose, CA (US)

(72) Inventor: Jyotikumar U. Menon, Clarksburg, MD (US)

(73) Assignee: Spirent Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,483

(22) Filed: May 18, 2020

(65) Prior Publication Data

US 2020/0280506 A1 Sep. 3, 2020

Related U.S. Application Data

(63) Continuation of application No. 15/979,314, filed on May 14, 2018, now Pat. No. 10,659,339.

(51) Int. Cl.
*G06F 15/16* (2006.01)
*H04L 43/50* (2022.01)
(Continued)

(52) U.S. Cl.
CPC ............ *H04L 43/50* (2013.01); *H04L 1/1642* (2013.01); *H04L 47/193* (2013.01); *H04L 67/14* (2013.01); *H04L 69/163* (2013.01)

(58) Field of Classification Search
CPC ..... H04L 47/193; H04L 67/14; H04L 67/141; H04L 67/142; H04L 67/143
See application file for complete search history.

(56) References Cited

U.S. PATENT DOCUMENTS 6,567,873 B1 5/2003 Henriksen
7,483,434 B2 1/2009 Biran et al.
(Continued)

OTHER PUBLICATIONS

"HP TCP/IP Services for OpenVMS Tuning and Troubleshooting", Hewlett Packard Enterprise Development LP, Dec. 22, 2017, http://h41379.www4.hpe.com/doc/732final/6631/6631pro_005.html, 7 pages.
(Continued)

*Primary Examiner* — Yves Dalencourt
(74) *Attorney, Agent, or Firm* — Haynes Beffel & Wolfeld LLP; Andrew Dunlap

(57) ABSTRACT

The disclosed technology teaches TCP session processing architecture for conducting numerous TCP sessions during testing of a network-under-test: multiple processor cores running, allocated to TCP session handling, and program instructions configured to distribute processing of each TCP session across multiple cores with a first set of cores allocated to handle TCP control, a second set of cores allocated to handle TCP packet transmission, and a third set of cores allocated to handle TCP packet receiving. The disclosed architecture also includes a shared memory accessible to the first, second and third sets of cores, that holds PCBs for each of numerous TCP sessions during the testing with update access controlled by an atomic spinlock processor instruction that each TCP state machine running on a core must engage to secure the update access to a respective PCB, in order to proceed with state processing of its respective TCP session.

20 Claims, 20 Drawing Sheets

(51) Int. Cl.
*H04L 1/16* (2006.01)
*H04L 67/14* (2022.01)
*H04L 47/193* (2022.01)
*H04L 69/163* (2022.01)

(56) References Cited

U.S. PATENT DOCUMENTS

| | | | |
|---|---|---|---|
| 8,996,920 B2 | 3/2015 | Fattah | |
| 10,659,339 B2 * | 5/2020 | Menon | H04L 69/163 |
| 2006/0056410 A1 | 3/2006 | Kawashima et al. | |
| 2016/0301613 A1 | 10/2016 | Boucher et al. | |

OTHER PUBLICATIONS

"SDN Architecture", ONF Open Networking Foundation, Issue 1, Jun. 2014, ONF TR-502, Palo Alto, CA 94303, www.opennetworking.org, 68 pages.
Verizon Network Infrastructure Planning "SDN-NFV Reference Architecture", Version 1.0, Feb. 2016, pp. 8-34 and pp. 138-156 (total of 220 pages).
Spirent "RFC 6349 Methodology Pack" for Spirent Methodology Center, spirent.com, Jun. 2017, 2 pages.
Spirent "Spirent Landslide Diameter", White Paper, spirent.com, Nov. 2017, 4 pages.
Constantine et al, Internet Engineering Task Force (IETF), "RFC 6349—TCP Throughout Testing Methodology", https://tools.ietf.org/html/rfc6349, Aug. 2011, 54 pages.
U.S. Appl. No. 15/979,314—Non-Final Office Action dated Nov. 27, 2019, 11 pages.
U.S. Appl. No. 15/979,314—Response to Non-Final Office Action dated Nov. 27, 2019 filed Dec. 9, 2019, 9 pages.
U.S. Appl. No. 15/979,314—Notice of Allowance dated Jan. 10, 2020, 9 pages.

* cited by examiner

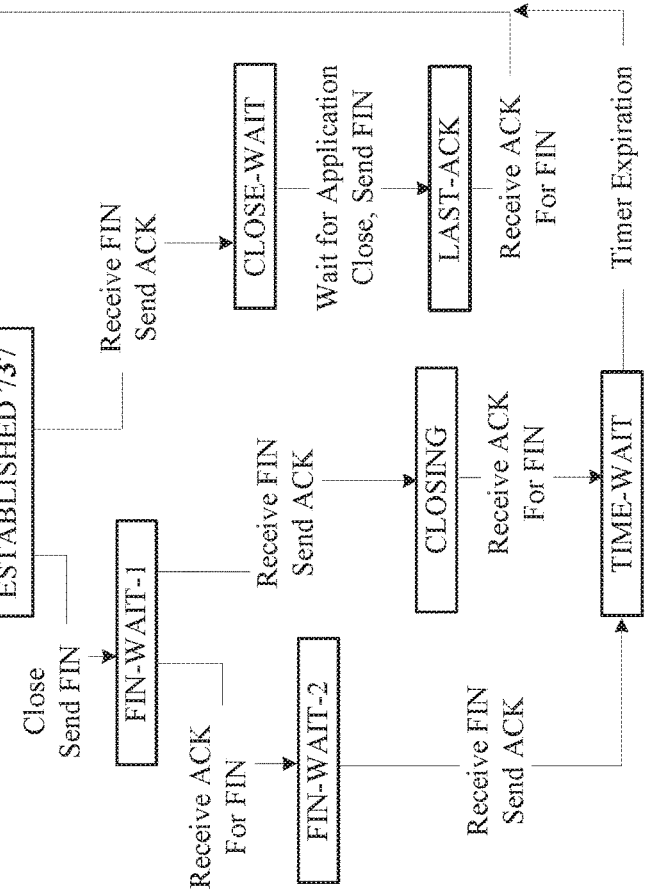
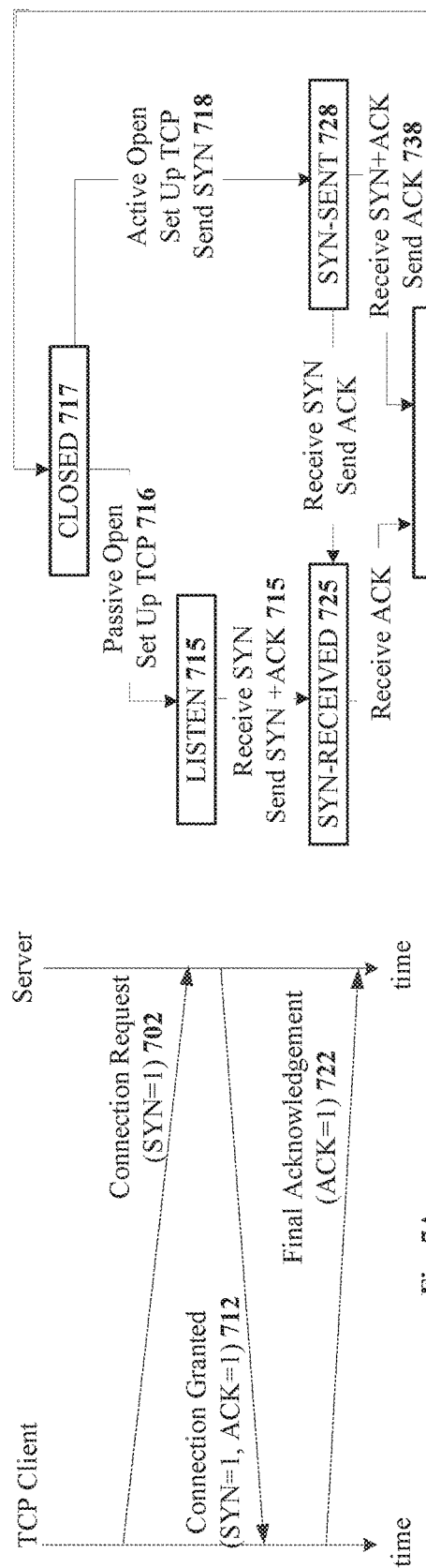
Fig. 7A
(sequence diagram of a pair of TCP FSMs
PRIOR ART)
Fig. 7B (TCP FSM - PRIOR ART)

```
 1  /** the TCP protocol control block */
 2
 3  typedef struct tcp_pcb {
 4      /* must be 1st */
 5      aops_entry_t node;
 6      u32_t is_lastacksent ;
 7
 8      /* Src MAC address (local IP) */
 9      uint64_t smac;
10      /* Dst MAC address */
11      uint64_t dmac;
12
13      gen_ip_address_t local_ip;
14      seg_t *unsent; /* Queue of unsent segments */
15
16      /* TCP options received for this connection */
17      opt_rcvd_t rcv_opt;
18      seg_t *unacked; /* Queue of unacked segments */
19
20      gen_ip_address_t remote_ip;
21      seg_t *pOos; /* out of sequence queue */
22
23      u32_t snd_wl1; /* Sequence and acknowledgement numbers of last */
24      void *pStat_; /* statistics ptr */
25
26      u32_t snd_wl2;     /* window update. */
27      struct tcp_pcb *next; /* for the linked list */
28
29      /* the maximum sender window announced by the remote host */
30      u32_t snd_wnd_max;
31
32      /* sender variables */
33
34      u32_t snd_nxt;  /* next new seqno to be sent */
35      u32_t snd_wnd;  /* sender window */
36
37
38      u32_t ts_recent;
39      u32_t tlastack; /* Highest acknowledged seqno. */
40
41      /* receiver variables */
42      u32_t rcv_nxt;  /* next seqno expected */
43      u32_t rcv_wnd;  /* receiver window available */
44      u32_t rcv_ann_wnd; /* receiver window to announce */
45      u32_t rcv_ann_right_edge; /* announced right edge of window */
46      u32_t cnt_error;
47      u32_t cnt_oos;
48
49      u32_t tmr;
50      /* RTT (round trip time) estimation variables */
51      u32_t rttest; /* RTT estimate in 500ms ticks */
52
53      u32_t rtseq; /* sequence number being timed */
54      /* congestion avoidance/control variables */
55      u32_t cwnd;
56
57      /* ports are in host byte order */
58      u16_t local_port;
59      /* ports are in host byte order */
60      u16_t remote_port;
61      u16_t mss; /* maximum segment size */
62      u16_t ivid;
63
64      u32_t state; /* TCP state */
65      u32_t num_retrans;
66
67      /* Retransmission timer */
68      s16_t rtime;
69
70      /* Variables in Van Jacobsons algorithm for RTT calculation from paper */
71      s16_t sa; /* scaled average for RTT */
72      s16_t sv; /* scaled mean deviation in RTT */
73      s16_t rto; /* retransmission time-out */
74
75      u16_t acked;
76      u16_t vid;
77      u8_t last_timer;
78      u8_t queue_type;
79
80
```

FIG. 8

```
 81  u8_t nrx;    /* number of retransmissions */
 82               /* fast retransmit/recovery */
 83  u8_t dupacks;
 84  u8_t pcb_type; /* pcb_type_e */
 85  /* Persist timer back-off */
 86  u8_t persist_backoff;
 87
 88  u8_t recv_flags; /* TF_XX values */
 89  u8_t persist_cnt; /* Persist timer counter */
 90  u8_t flags;
 91
 92  u16_t do_param_xch:1;
 93  u16_t do_cookie_xch:1;
 94
 95  u16_t t7;
 96  u32_t srtt; /* smoothed RTT */
 97
 98  u32_t ssthresh;
 99  uint32_t lock_owner;
100
101  u32_t snd_nxt_scheduled;
102  u32_t client_id;
103  spinlock_t lock;
104
105  /* Dont move, as anything below this is not zero'd */
106  s32_t hash_idx; /* index into hash table */
107
108 } tcp_pcb_t;
```

Retransmission Count 904

FIG. 9

(TCP Sliding Windows – PRIOR ART)

ENHANCING TRANSMISSION CONTROL PROTOCOL (TCP) PERFORMANCE AND SCALABILITY ON MULTICORE PROCESSOR ARCHITECTURES

PRIORITY DATA

This application is a continuation of U.S. application Ser. No. 15/979,314, now U.S. Pat. No. 10,659,339, entitled "Enhancing Transmission Control Protocol (TCP) Performance and Scalability on Multicore Processor Architectures," filed on May 14, 2018, which is incorporated by reference herein.

FIELD OF THE TECHNOLOGY DISCLOSED

The technology disclosed relates generally to testing a "network under test" (NUT) located between one or more emulated servers and emulated clients. Particularly, the technology relates to enhancing capacity of a test device to conduct numerous transmission control protocol (TCP) sessions during testing of a NUT. More specifically, the technology discloses enhancing testing for TCP delivery of Internet Protocol (IP) multimedia services over conventional networks, software-defined networks (SDN) and network function virtualization (NFV) architectures.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

Network service providers need to care about the experience of their subscribers, even if the aggregate performance of individual devices or whole networks is at some astronomically high level. In the world of service providers, subscribers often do not care how much bandwidth the big routers at the core of the Internet can deliver. They care about getting the bandwidth and the experiences for which they are paying. Some of those subscribers may be paying extra for a high quality of service, ensuring a certain level of bandwidth, lower latency, etc. This will be reflected in the differentiated services code points (DSCP), virtual local area network (VLAN) IDs, and VLAN priority bits used to identify packets, or qualities of service, which might be treated differently from other packets—similar in concept to business class airline passengers who pay more, and therefore expect more from their experience. Some network subscribers are paying for more bandwidth so they can share their personal experiences in real-time—at a large outdoor concert in one example, via live streaming, utilizing video and audio traffic which is transported over transmission control protocol (TCP).

Over 90% of traffic on the Internet is based on TCP, which is stateful in nature. TCP is a connection-oriented transport protocol that sends data as an unstructured stream of bytes. By using sequence numbers and acknowledgment messages, TCP can provide a sending node with delivery information about packets transmitted to a destination node. For TCP, the connections need to be established before any data is sent, and the rate at which data is sent will ebb and flow depending on how congested the overall network is.

TCP protocol was originally designed to be implemented as a single state machine; that is, with serialized processing of events. In existing methods for conducting TCP sessions during testing of a NUT, the TCP state machine runs on a single processor core even when multiple CPU cores are available. As network transmission rates increase, the need for increased performance also increases.

An opportunity arises to enhance performance by leveraging multi-core CPU architectures for conducting numerous TCP sessions during testing of a NUT, which can improve the performance and scalability of the network.

SUMMARY

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of the summary is to present some concepts related to some exemplary non-limiting implementations in a simplified form as a prelude to the more detailed description of the various implementations that follow.

The disclosed technology teaches a novel TCP session processing architecture for conducting numerous TCP sessions during testing of a NUT. The architecture includes multiple processor cores running, allocated to TCP session handling, with some of the cores sharing a processor die. The architecture also includes program instructions configured to distribute processing of each TCP session across multiple cores in which a first set of cores is allocated to handle TCP session control, a second set of cores is allocated to handle transmission of TCP packets in a session, and a third set of cores is allocated to handle receipt of TCP packets in the session. The disclosed architecture further includes a shared memory accessible to the first, second and third sets of cores, that holds protocol control blocks (PCBs) for each of the numerous TCP sessions during the testing of the NUT, which include state information that is updated during set-up and operation of a TCP session. Update access to each of the PCBs is controlled by an atomic spinlock processor instruction that each state machine running on a core among the first, second and third sets of cores must engage to secure the update access to a respective PCB, in order to proceed with state processing of its respective TCP session.

Other aspects and advantages of the technology disclosed can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 7A depicts a three-way handshake sequence diagram of a pair of TCP finite state machines (FSMs), for a TCP client and a TCP server.

FIG. 7B depicts a TCP FSM, defined by a list of its states, its initial state, and the conditions for each transition.

FIG. 8 and FIG. 9 list the disclosed protocol control block data structure, in detail.

DETAILED DESCRIPTION

Figure 1:
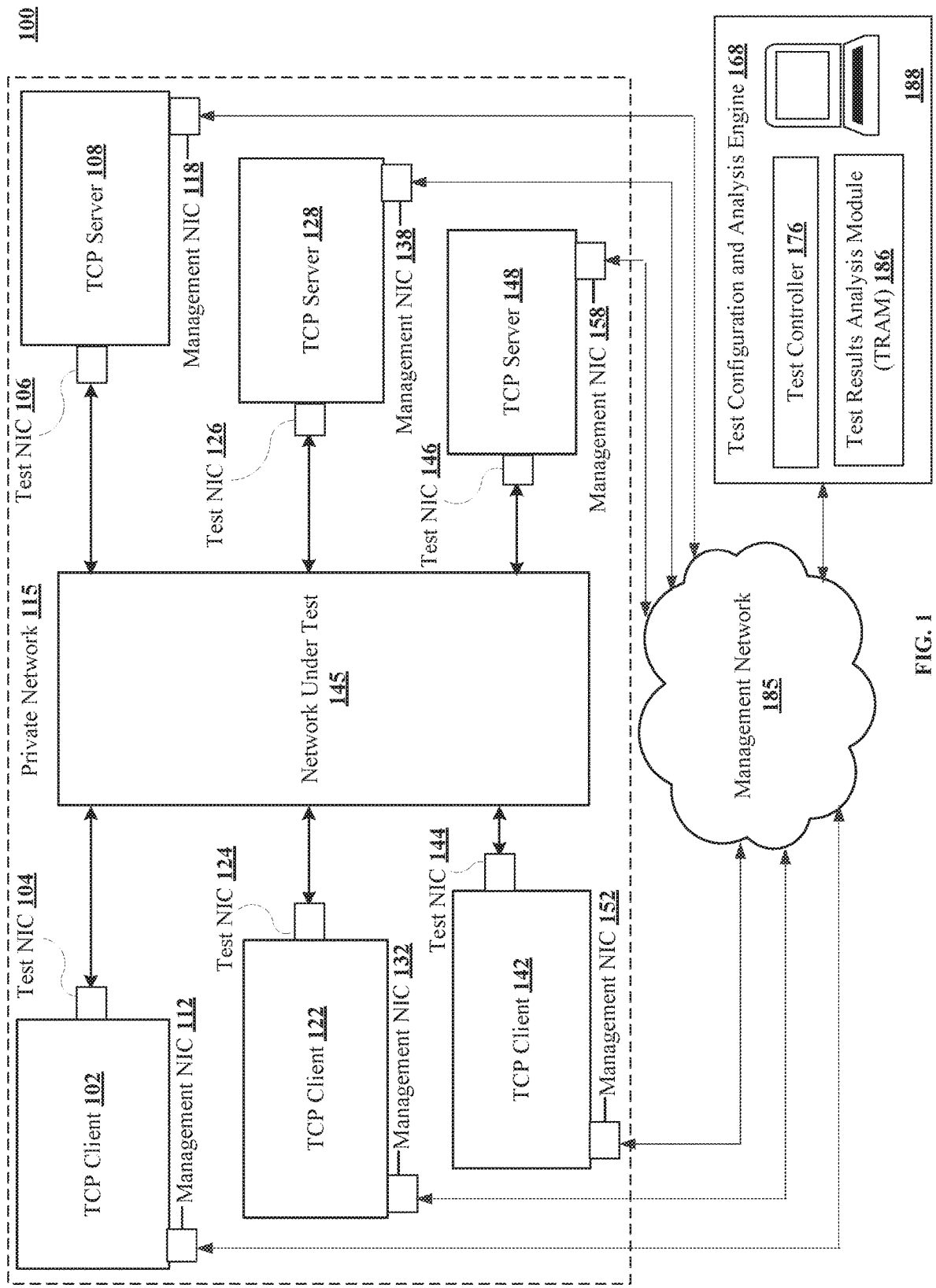
FIG. 1 depicts an exemplary system for transmission control protocol (TCP) session processing and measurement for conducting numerous TCP sessions during testing of a network-under-test, according to one implementation of the technology disclosed.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Transmission Control Protocol (TCP) is a highly reliable connection-oriented method of communication between two hosts in a communication network. The communication network can utilize a conventional network architecture comprising routers and switches, or NFV architecture comprising virtualized routers and switches, or SDN architecture in which the control plane and data plane are separated into white box routers and switches.

TCP provides reliable, ordered, and error-checked delivery of a stream of octets (bytes) between applications running on hosts communicating by an IP network. Major Internet applications such as the World Wide Web, email, remote administration, and file transfer rely on TCP.

A typical sequential TCP transmission implementation builds appropriate packets during handling of different events, including an application posting a request for data transmission; an acknowledgement arriving from a remote TCP; data arriving from a remote TCP, triggering transmission of a data acknowledgement; and expiration of a transmission, persist or delayed ACK timer. The host that initiates the TCP connection is called a TCP client and the host that accepts the TCP connection is called a TCP server.

The TCP protocol is serialized and has historically been implemented with the entire finite state machine (FSM) of the TCP client or the TCP server running on a single core. The problem with this approach is that each step in the event processing of the FSM needs to be completed before proceeding to the next step. This causes a significant reduction in transmission rates that can be achieved, especially with a larger number of streams between the client and the server.

Prior art of a finite state machine for test code generation is explained in U.S. Pat. No. 8,996,920, issued on Mar. 31, 2015 and entitled "FINITE STATE MACHINE METHOD FOR TEST CASE GENERATION AND EXECUTION OF COMMUNICATION PROTOCOLS", which is incorporated by reference herein in full.

The disclosed technology enhances TCP test performance and scalability on multicore processor architectures by distributing the TCP finite state machine among multiple CPU cores, each of which has access to common shared memory, and running the state machine asynchronously. Some of the CPU cores are reserved for transmission of TCP packets only. Some of the CPU cores are reserved for reception of TCP packets only. There can be multiple streams between the TCP client and TCP server which can be uniquely identified by the network layer (IP) source and destination address and by transport layer (TCP) source and destination port numbers and optionally link layer (Ethernet) VLAN tags. A TCP session processing environment for enhancing TCP performance and scalability is described next.

FIG. 1 shows an example transmission control protocol (TCP) session processing architecture 100 for distributing TCP finite state machine among multiple CPU cores, all of which have access to common shared memory, and running the state machine asynchronously to conduct numerous TCP sessions during testing of a network-under-test. Architecture 100 includes TCP clients 102, 122, 142 with test network interface controllers (NICs) 104, 124, 144 and management NICs 112, 132, 152. The NICs implement the electronic circuitry required to communicate using a specific physical layer and data link layer standard such as Ethernet or Wi-Fi, as a base for a full network protocol stack, allowing communication among small groups of computers on the same local area network (LAN) and large-scale network communications through routable protocols, such as Internet Protocol (IP). Architecture 100 also includes TCP servers 108, 128, 148 with test NICs 106, 126, 146 and management NICs 118, 138, 158. In some implementations, a single NIC can be used to implement the test network and the management NIC functionality for a client or a server. The multiple TCP clients 102, 122, 142 and multiple TCP servers 108, 128, 148 can be implemented as virtual test applications (VTAs) running the TCP measurement application on a virtual test platform (VTP), as virtual network functions (VNFs) inside a virtual machine (VM) or in a Docker container running on a physical host—in software-defined networking (SDN) and network-function virtualization (NFV) environments. The VM is a self-contained environment with its own operating system (VMOS) separate from the host operating system which runs the hypervisor and controls the VMs. Each VM has its own processor address space, memory address space and networking address space with network layer resources including Internet Protocol (IP) addresses and transport layer resources including TCP port numbers. The Docker container is a lightweight self-contained environment sharing the host operating system, but with its own processor address space, memory address space and networking address space with network layer resources including IP addresses and transport layer resources including TCP port numbers.

Continuing with the description of FIG. 1, architecture 100 includes network-under-test 145, which can use NFV architecture comprising virtualized routers and switches, an SDN architecture in which the control plane and data plane are separated into white box routers and switches, or a conventional network architecture comprising routers and switches. The TCP measurement tests are run using the test NICs over the network-under-test 145. Also included in architecture 100 is management network 185 over which test configuration and analysis engine 168 communicates with TCP clients 102, 122, 142 via management NICs 112, 132, 152 and with TCP servers 108, 128, 148 using management NICs 118, 138, 158—including initiating tests for use by TCP clients and TCP servers. Test configuration and analysis engine 168 includes test controller 176 and test results analysis module (TRAM) 186.

The tests are designed for service assurance testing of a customer's revenue generating SDN network. Control setup is one part of the testing procedures. A network operator specifies network routes as part of the virtual platform. A network maintenance operations manager sets up the configuration files for the network to be tested, including details such as how many test sessions for which server nodes, via user interface 188. In some implementations, multiple network maintenance operations managers, each setting up files for testing systems in their own company's network name spaces, could utilize multiple test controllers to configure multiple sets of test sessions for multiple networks. Test controller 176 sends the completed files to TCP clients and TCP servers, which parse the files and create a shared-memory data store. In some implementations, test controller 176 manages the test agents and probes, providing test instructions to the test probes, coordinating the test scheduling when multiple tests with large number of test probes are executed, and retrieving results from TRAM 186 to provide actionable information to the network operator.

Figure 2:
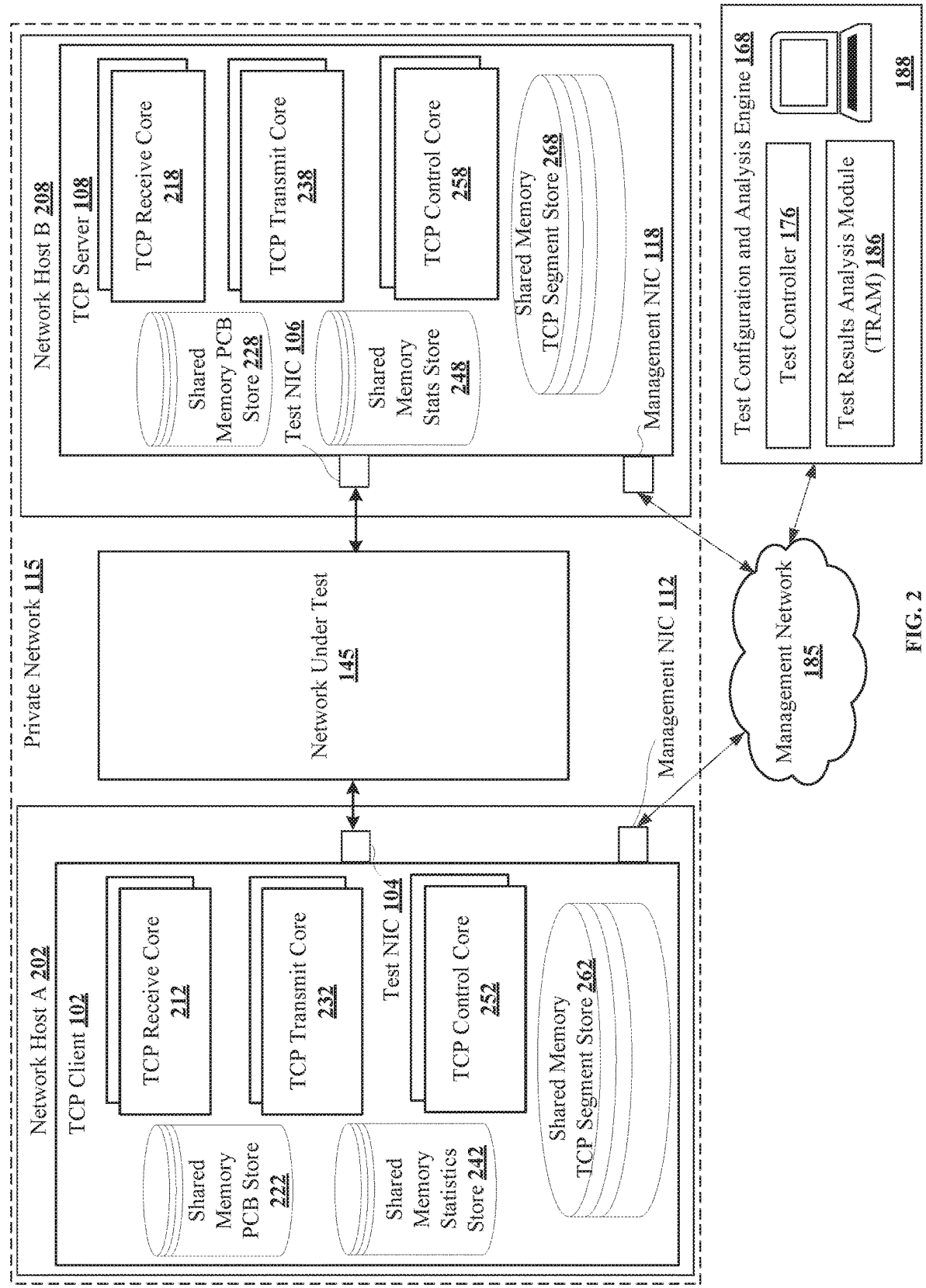
FIG. 2 shows an expanded view of a single TCP client virtual test application (VTA) and a single TCP server VTA.

FIG. 2 shows an expanded view of network host A 202 with an example single TCP client 102 VTA and network host B 208 with an example single TCP server 108 VTA. A number of CPU cores can be assigned to the single TCP client 102 VTA, depending on the number of TCP streams that need to be supported and the bandwidth and frame size used in the TCP test. These CPU cores are assigned at the time of creation of the TCP client and TCP server VTAs. TCP client 102 runs: as a VNF on a VM, on a Docker, or on a computer executing instructions directly on logic hardware without an intervening operating system. TCP client 102 is deployed at network host A 202 in private network 115 and TCP server 108 runs: as a VNF on a VM, on a Docker, or on bare metal at network host B 208 in private network 115. TCP client 102 and TCP server 108 test the paths between network host A 202 and network host B 208. In one implementation, private network 115 refers to a service provider network. In another implementation, private network 115 can refer to a different network to be tested.

When the TCP client application starts running after the test is initiated from the TCAE 168, it classifies some of the cores as TCP control cores 252, some of the cores as TCP transmit cores 232 and some of the cores as TCP receive cores 212. The TCP control thread that runs on the TCP control cores is responsible for communicating with the TCAE 168 and parsing the TCP streams and collecting and sending test results. The TCP control thread is also responsible for creating, using special operating system commands, shared memory protocol control block (PCB) store 222, shared memory statistics store 242 and shared memory TCP segment store 262 in shared memory so that the stores are accessible to all client cores running the application. Shared memory TCP segment store 262 includes the segments—the individual units of data transmission that a message is divided into for efficient routing through the network, for the TCP streams. Shared memory PCB store 222 contains the PCBs for each TCP test stream, with the state variable for a TCP FSM set to CLOSED to start, so the PCB lock status is free, as described infra. A TCP control thread also runs on each of the TCP transmit cores and on each of the TCP receive cores.

Within a TCP client, the transmit, receive and control cores use the same shared memory PCB store 222, shared memory statistics store 242 and shared memory TCP segment store 262. The shared memory used is independent for TCP client 102 and TCP server 108.

Similarly, when the TCP server 108 application starts running after the test is initiated from the TCAE 168, it classifies some of the cores as TCP control cores 258, some of the cores as TCP transmit cores 238, and some of the cores as TCP receive cores 218. The TCP control thread that runs on the TCP control cores is responsible for communicating with the TCAE 168 and parsing the TCP streams and collecting and sending test results. It is also responsible for creating, using special operating system commands, shared memory PCB store 228, shared memory statistics store 248 and shared memory TCP segment store 268 in shared memory so that the stores are accessible to all the cores running the server application. The shared memory PCB store contains the PCBs for each TCP test stream, with the state variable for a TCP FSM set to LISTEN to start, so the PCB lock status is free.

When session tests are complete, TCP clients 102, 122, 142 store the performance measurement results in shared memory statistics store 242 and send the performance metric session test results to TRAM 186 for use by test controller 176 in analyzing the network under test 145. Statistics are calculated and reports are generated using a statistics and reporting thread that accesses the shared memory TCP segment store 262 which maintains statistics per stream and session in shared memory statistics store 242. In one implementation, TRAM 186 is an integral part of test configuration and analysis engine 168 that collects or receives test results from the network hosts and analyzes test results and presents the results to an operator in an actionable format via user interface 188. In one implementation, the reports can be very large and they get generated often—potentially every one minute, two minutes or ten minutes, depending on the parameters set by the operator to test the specific network.

For example, testing of a network with three thousand nodes with 75 kB per five minutes for each node produces billions of bytes of test results per twenty-four hour period. In some implementations the report data gets analyzed via big data analytics.

A TCP connection progresses through several states: connection establishment, sending of bi-directional data and connection close. The host that initiates the TCP connection is called a TCP client and the host that accepts the TCP connection is called a TCP server. The TCP client and TCP server maintain an event-driven finite state machine (FSM) for connection control. TCP client and TCP server communicate using TCP segments with flags to send control information. These TCP control segments are the events that trigger state transitions in the TCP FSM. The TCP FSM is defined by a list of its states, its initial state, and the conditions for each transition, as shown in FIG. 7B and listed next.

| State | Description |
|---|---|
| CLOSED | All connections start in CLOSED state |
| LISTEN | The TCP server prepares to accept connections by transitioning to LISTEN state |
| SYN-SENT | TCP client initiates a connection by sending a TCP segment with SYN flag set and transitions to SYN-SENT state |
| SYN-RCVD | TCP server accepts a connection by sending a TCP segment with the SYN flag and the ACK flag set and transitions to SYN-RCVD state |
| ESTABLISHED | TCP client completes the connection by sending a TCP segment with the ACK flag set and transitions to ESTABLISHED state. TCP server also transitions to ESTABLISHED state on receiving this ACK segment. Bi-directional data transfer starts in this state. |
| FIN-WAIT-1 | TCP client in ESTABLISHED state initiates a connection close by sending a TCP segment with FIN flag set and transitions to FIN-WAIT-1 state. |
| FIN-WAIT-2 | A TCP client in FIN-WAIT-1 state receives a TCP segment with ACK flag set and transitions to FIN-WAIT-2 state. |
| CLOSING | A TCP client in FIN-WAIT-1 state receives a TCP segment with FIN flag set and sends a TCP segment with ACK flag set and transitions to CLOSING state. A TCP client in CLOSING state transitions to TIME-WAIT state after receiving a TCP segment with ACK flag set. |
| TIME-WAIT | A TCP client in FIN-WAIT-2 state receives a TCP segment with FIN flag set and sends a TCP segment with ACK flag set and transitions to TIME-WAIT state. A TCP-client in TIME-WAIT state transitions to CLOSED state after timer expires. |
| CLOSE-WAIT | A TCP server in ESTABLISHED state receives a TCP segment with FIN flag set and sends a TCP segment with ACK flag set and transitions to CLOSE-WAIT state. |
| LAST-ACK | A TCP server in CLOSE-WAIT state sends a TCP segment with FIN flag set and enters LAST-ACK state. A TCP server in LAST-ACK state receives a TCP segment with ACK flag set and enters CLOSED state. |

The disclosed technology utilizes a linked list of protocol control blocks (PCBs) for each of the numerous TCP sessions to be used during the testing of the NUT. The PCBs in the linked list are accessed via a hash table, for performance.

When a receive core receives a TCP segment, the local IP, local port, remote IP, remote port and VLAN from the received packet are used to generate a hash index and the PCB is accessed using the hash table, described further infra.

FIG. 3 through FIG. 6A show a three-way handshake example with TCP finite state machine (FSM) state transitions for a TCP client and TCP server pair, and with the linked list of protocol control blocks (PCBs). FIG. 6B shows an example hash index for the shared memory PCB stores 222, 228. The disclosed TCP finite state machine is distributed among multiple CPU cores, all of which have access to common shared memory, and the state machine runs asynchronously to conduct numerous TCP sessions during testing of a network-under-test.

FIG. 7A shows a sequence diagram of the three-way handshake for a pair of TCP FSMs for TCP client and TCP server. First, a TCP client sends a connection request to the TCP server, with SYN equal to one 702. The TCP server acknowledges and grants the request by sending SYN equal to one and ACK equal to one 712 to TCP client. TCP client acknowledges receipt of the SYN equal to one and ACK equal to one from the TCP server by responding with ACK equal to one 722. TCP server receives the final acknowledgement and the TCP connection is established.

FIG. 7B shows a TCP FSM, which is described next. The TCP client starts in the CLOSED state 717. When Active Open Set Up TCP Send SYN 718 is used by a TCP client to initiate a connection to the TCP server, the TCP client initiates a connection to the TCP server by sending the SYN segment and enters the SYN-SENT state 728. This step is shown in and described relative to FIG. 3 infra. When the TCP server uses Passive Open FSM 716 to accept a connection from the TCP client, it passively waits for a connection by going into LISTEN state 715. When the TCP server receives the SYN segment from the TCP client, TCP server sends back a SYN-ACK segment. This step is shown in and described relative to FIG. 4 infra. The server enters the SYN-RECEIVED state 725. The TCP client receives the SYN-ACK segment from the TCP server, and sends the ACK segment and enters the ESTABLISHED state 737. When the TCP server receives the ACK segment from the TCP client, the server enters the ESTABLISHED state 737, as shown in and described relative to FIG. 5 and FIG. 6A infra.

Figure 3:
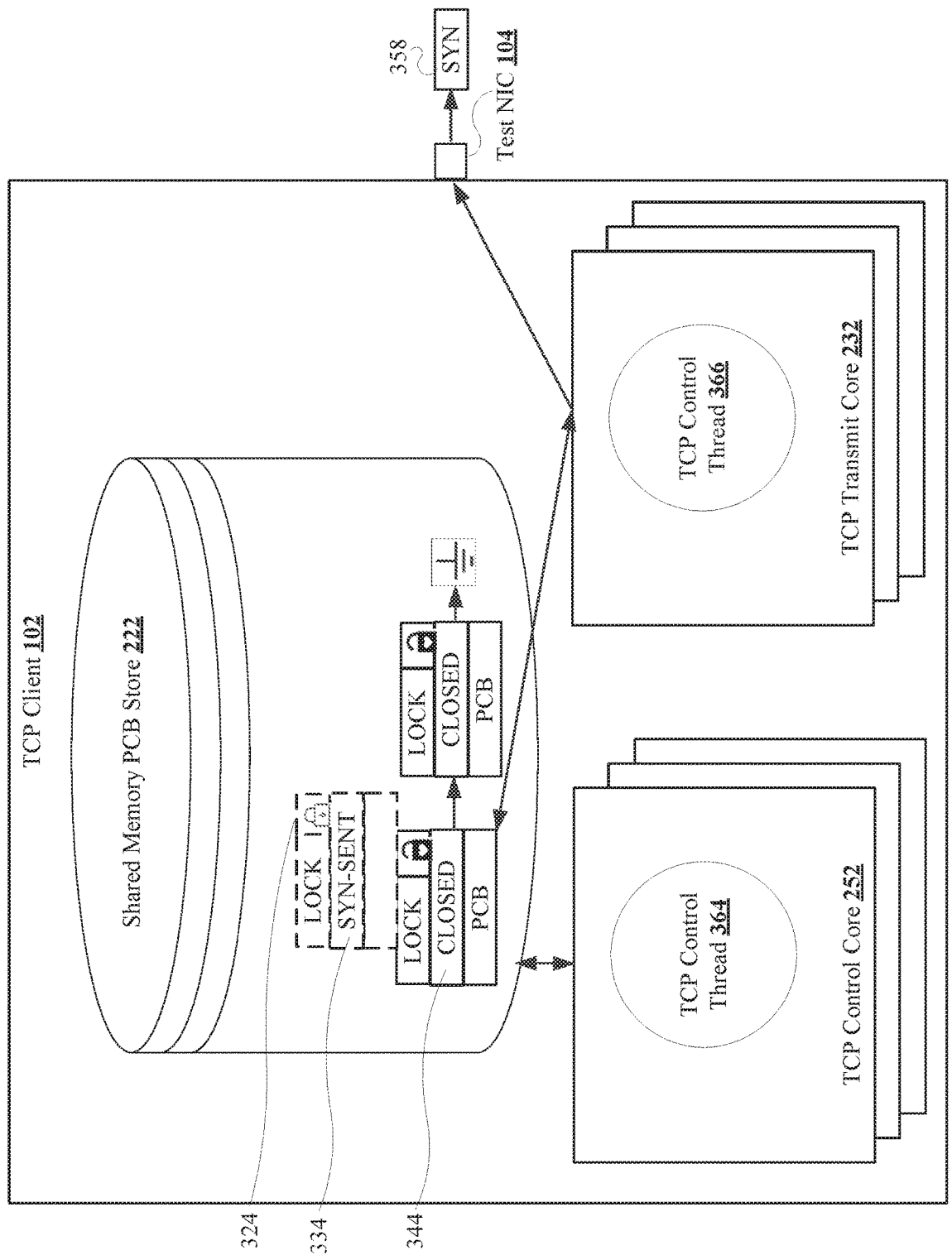
FIG. 3 shows example TCP FSM state transitions in a 3-way handshake example with TCP FSM state transitions for a TCP client and TCP server pair.

FIG. 3 shows an example with open TCP FSM state transitions. In this step, the TCP client 102 sends a connection request to the TCP server, with SYN equal to one 358, as shown in the sequence diagram of FIG. 7A as 702. That is, TCP control thread 366 running on transmit core 232 of TCP client 102 accesses shared memory PCB store 222 to review the linked list of PCBs to learn whether the spinlock is free by checking whether the state for this PCB is CLOSED 344 and acquires control of the PCB by locking it. When the state variable is set to CLOSED, the PCB lock status is free. Once the PCB is locked, the TCP control thread 366 on the transmit core 232, initiates the first step of the three-way handshake of the TCP state machine by transmitting a SYN segment 358 to TCP server 108 and updating the state variable in the PCB to SYN SENT 334 and locking the PCB as illustrated by the closed lock icon 324. The other TCP control threads running on other transmit cores for TCP client 102 will not be able to use this PCB while it is locked. The ground signal shows that the last entry in the linked list of PCBs is a null.

Figure 4:
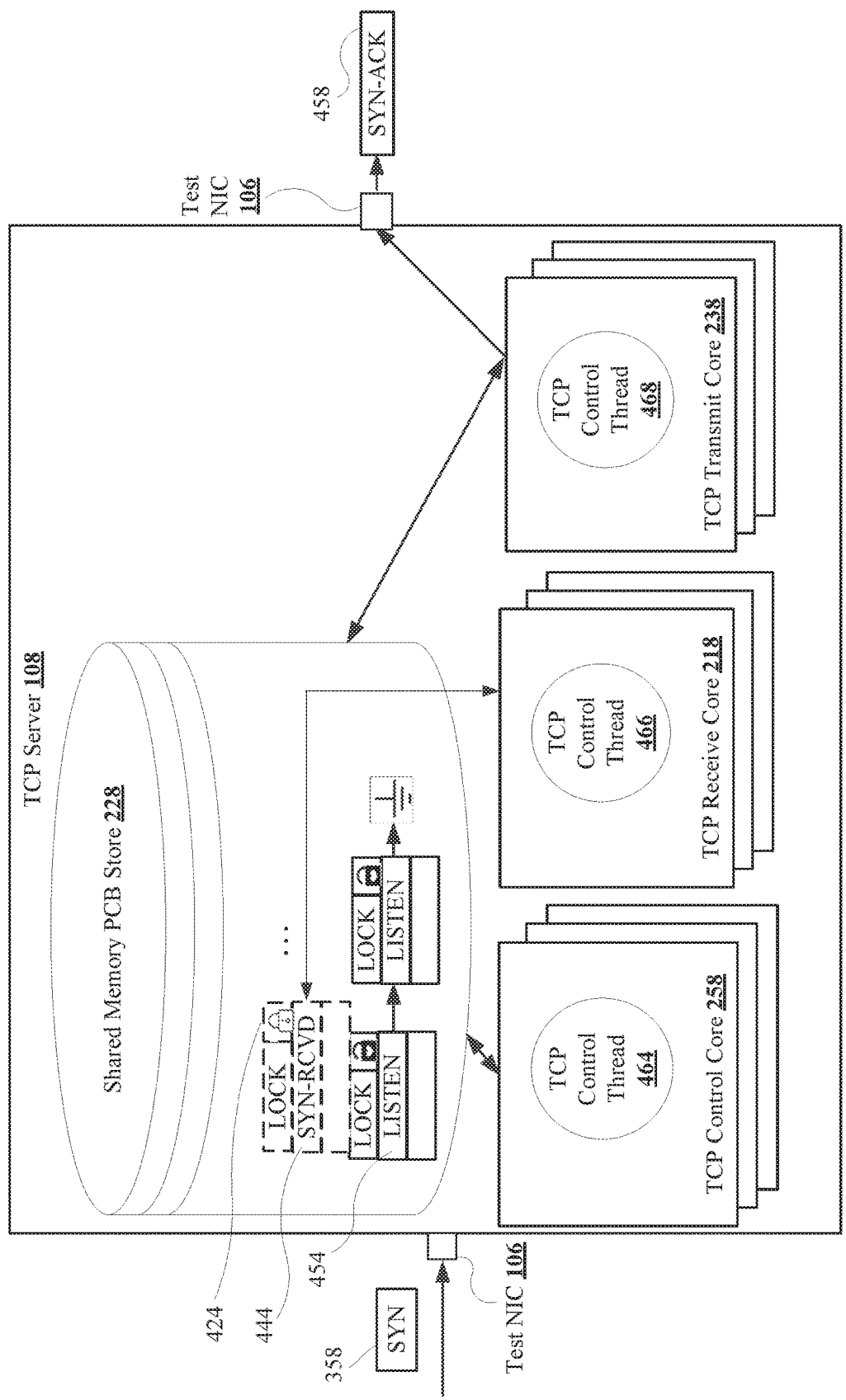
FIG. 4 shows the next steps of the 3-way handshake example after those depicted in FIG. 3, with TCP FSM state transitions.

FIG. 4 shows the next step of the three-way handshake example, with TCP FSM state transitions. TCP server 108 receives the SYN 358 sent from TCP client 102, and acknowledges and grants the request by sending a SYN ACK 458 with SYN equal to one and ACK equal to one as shown in the sequence diagram of FIG. 7A as 712. When the state is set to LISTEN 454, the PCB lock status is free. In detail, the TCP control thread 464 running on TCP control core 258 monitors the states stored in shared memory PCB store 228. When the TCP server 108 receives the TCP SYN segment 358 from TCP client 102, the TCP control thread running on the receive core 466 accesses shared memory PCB store 228 to review the linked list of PCBs to learn whether the spinlock is free. The TCP control thread 468 running on the transmit core acquires control of the PCB by locking it as shown by the closed lock icon 424. When the state is locked with SYN-RCVD 444 for this PCB, a TCP SYN-ACK segment 458 is transmitted back to the TCP client 102 from TCP server 108.

Figure 5:
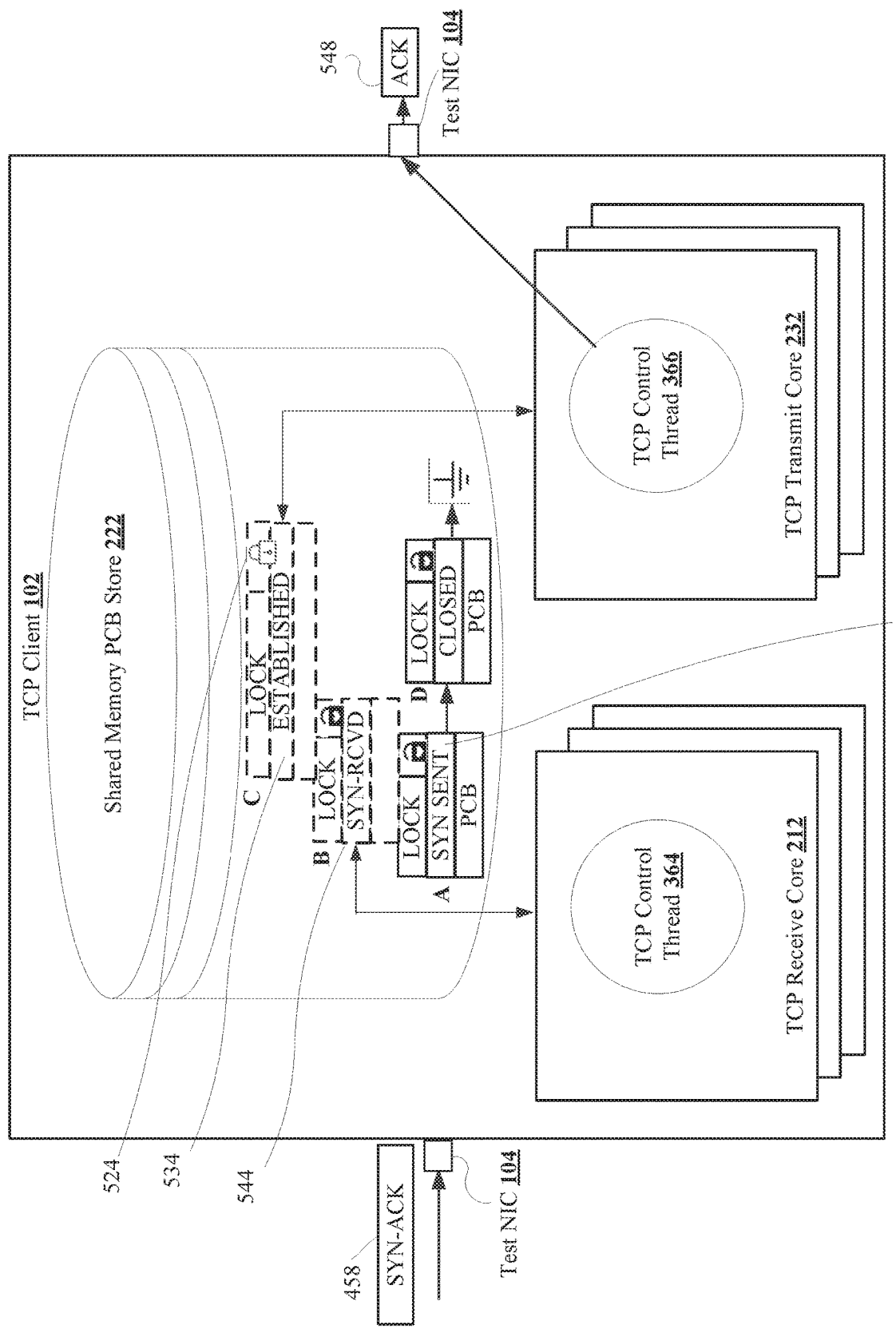
FIG. 5 shows additional steps of the TCP FSM state transition example of FIG. 3 and FIG. 4 that occur when the TCP client receives the TCP SYN-ACK segment, and the TCP control thread acquires the lock on the PCB.

FIG. 5 shows the third step of the three-way handshake example of TCP FSM state transitions. When TCP client 102 receives the SYN-ACK segment 458 from TCP server 108, the TCP control thread 364 running on the receive core 212 acknowledges receipt of the SYN equal to one and ACK equal to one by responding with ACK equal to one as shown in the sequence diagram of FIG. 7A as 722. TCP control thread 364 checks and learns that the state is set to SYN-SENT 554, and updates the state to SYN-RCVD 544. The receipt of the SYN-ACK segment 458 causes the state to change to ESTABLISHED 534. The TCP control thread 366 running on the transmit core 232 goes through the linked list of PCBs in the PCB store and checks to learn whether the spinlock is free, and if it is free acquires control of the PCB by locking it. If the previous state is set to SYN-RCVD, then a TCP ACK segment 548 is transmitted back to the TCP server 108 from the TCP client 102 and the state is set to ESTABLISHED 534. PCB is locked as shown by the closed lock icon 524.

Figure 6B:
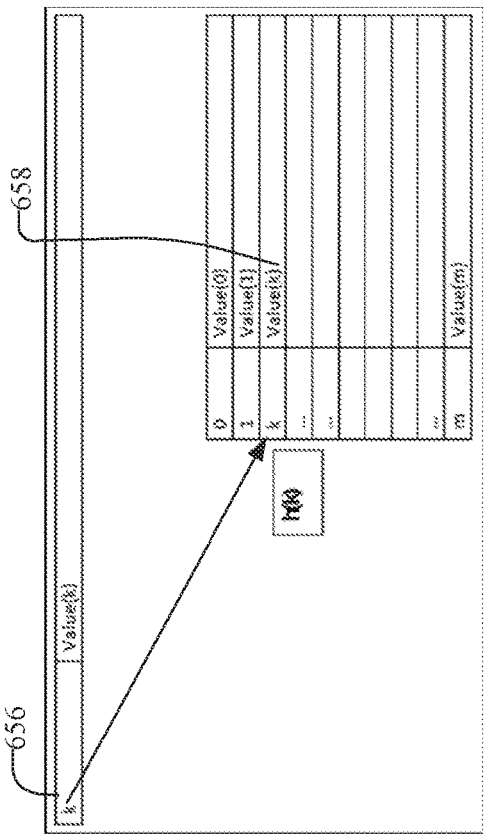
FIG. 6B shows an example hash index for a shared protocol control block (PCB).
Figure 6A:
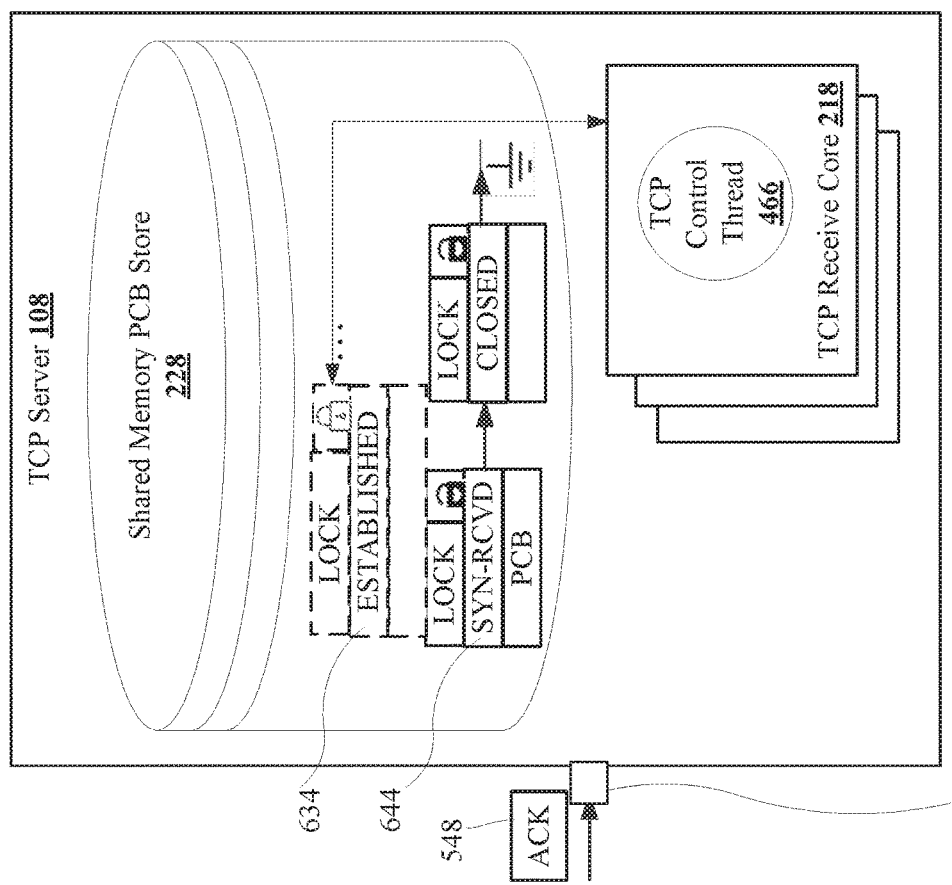
FIG. 6A shows the completion of the 3-way handshake example for the pair of TCP client and TCP server, with TCP FSM state transitions.

FIG. 6A shows the completion of the three-way handshake example for the pair of TCP client 102 and TCP server 108, with TCP FSM state transitions. When TCP server 108 receives the ACK segment 548 from TCP client 102, the TCP control thread 466 running on the receive core 218 acquires the lock on the PCB. If the state is set to SYN-RCVD 644 then the state is updated to ESTABLISHED 634 and the connection is established between TCP client 102 and TCP server 108 and the PCB is released by freeing the lock; and the 3-way handshake for this TCP client and TCP server pair is complete.

Shared memory PCB store 222 and shared memory PCB store 228 are each implemented with a hash table—an associative array that maps a stream to the unique identifiers of the stream. A hash function is used to compute an index into the array to the session server. An advantage of using the hash table is the minimal time taken to insert, access, and delete entries. Hashing is the method of distributing the entries, which are the key/value pairs, into an array of buckets. Given a key, the hash function computes an index marking the location of the entry. The load factor is an important performance indicator for the hash table: load-factor=n/b where n is the number of entries as key/value pairs, and b is the number of buckets in the array. In one implementation, a load-factor of 0.5 has been empirically found to be optimal.

Index=f(key) where f is the hash function.
The index can be calculated as follows:
hash=hash_func(key, keylen, magic_number).
The magic_number is empirically calculated for different datasets. A magic number that is appropriate for one example dataset is 0x5a5ee1d9. Hash functionality includes mixing the key value using standard arithmetic operators, including shifts and exclusive-or operations using further magic numbers such as 0x5bd1e995 and 12 so that a resultant hash value spreads across the key address space to prevent collisions. The index can be calculated as follows.

Index=hash & (array-size−1)

In one use case, the array-size is selected to be $2^i$ in which the exponent i is close to the value of 2*n, to get a load-factor of 0.5 and to avoid the use of the modulo operator and use the 'and' operator, which can be implemented faster in the CPU hardware.

FIG. 6B shows an example TCP server hash table data store entry. When the receive core receives a TCP segment, the local IP, local port, remote IP, remote port and VLAN from the received packet are used to generate a hash index input k 656 and the PCB is accessed using the hash table. Each value (k) 658 is a pointer to the stream data stored in memory, using the structures listed in the following data structures.

A protocol control block (PCB), created for each stream in shared memory, stores the unique identifiers of the stream, the state of the stream and an atomic spinlock to guarantee exclusive access to the PCB from multiple cores. FIG. 8 and FIG. 9 show the protocol control block data structure, in detail. For example the count of retransmission attempts for fast retransmit and recovery 904 is specified. The PCB includes several structures, including the TCP state, atomic operations list entry, IP addresses, TCP timestamp and received TCP options, which are listed next. The TCP state machine states are enumerated via the convention specified in IETF RFC 793.

```
typedef enum tcp_state {
    CLOSED      = 0,
    LISTEN      = 1,
    SYN_SENT    = 2,
    SYN_RCVD    = 3,
    ESTABLISHED = 4,
    FIN_WAIT_1  = 5,
    FIN_WAIT_2  = 6,
    CLOSE_WAIT  = 7,
    CLOSING     = 8,
    LAST_ACK    = 9,
    TIME_WAIT   = 10,
    RESET       =11
} tcp_state_e;
/* Atomic operations list entry */
typedef struct _aops_entry_t {
    struct _aops_entry_t *nxt_entry;
} aops_entry_t;
/** Format used to store IPv4/IPv6 addresses */
```

```
typedef union
{
        uint8_t v6[16];
        uint32_t value32[4];
        uint64_t value64[2];
} __attribute__((packed)) gen_ip_address_t;
/** TCP timestamp format */
typedef union sp_ts {
        struct {
            uint64_t seconds:32;
            uint64_t microseconds:32;
        };
        uint64_t value64;
} sp_ts_t;
/** Structure to store received TCP options */
typedef struct tcp_opt_rcvd {
        u16_t  mss_clamp;        /* Maximal mss, negotiated at connection setup */
        u16_t  user_wnd;         /* Window size configured by user */
        u16_t  user_mss:12;      /* mss requested by user in ioctl */
        u16_t  user_scale:4;     /* Window size configured by user */
        u8_t   sack_ok:4;        /* SACK seen on SYN packet */
        u8_t   snd_wscale:4;     /* Window scaling received from sender */
        u8_t   rcv_wscale:4;     /* Window scaling to send to receiver */
        u8_t   saw_tstamp:1;     /* Saw TIMESTAMP on last packet */
        u8_t   tstamp_ok:1;      /* TIMESTAMP seen on SYN packet */
        u8_t   dsack:1;          /* D-SACK is scheduled */
        u8_t   wscale_ok:1;      /* Wscale seen on SYN packet */
} opt_rcvd_t;
```

The TCP segment protocol data unit (PDU) data structure, sometimes referred to as a TCP packet, is listed next.

```
/* TCP segment PDU */
typedef struct _seg {
    /* must be 1st */
    aops_entry_t node;
    u64_t seqno:32;
    u64_t ackno:32;
    u64_t len: 16;
    union {
        struct {
            u64_t doff:4;       /* Data offset */
            u64_tres1:3;        /* Reserved */
            u64_t ns:1;         /* ECN-nonce concealment protections RFC3540 */
            u64_tcwr:1;         /* Congestion Window reduced RFC3168 */
            u64_tece:1;         /* ECN-echo */
            u64_turg:1;         /* Upgent data set */
            u64_tack:1;         /* ACK bit */
            u64_tpsh:1;         /* Data push bit */
            u64_trst:1;         /* Reset the connection */
            u64_tsyn:1;         /* Synch seq numbers */
            u64_tfin: 1;        /* No more data from sender */
        };
        struct {
            u64_t flag_val:12;
            u64_t doff_val:4;
        };
    };
    u64_t unused:32; /* For alignment */
    sp_ts_t ts; /**< timestamp for this send */
    struct _seg * next;
} seg_t;
```

The TCP data structure for spinlocks for concurrency is listed next.

```
/** * Spinlocks for concurrency */
typedef struct {
    volatile uint32_t value;
} spinlock_t;
```

Figure 10:
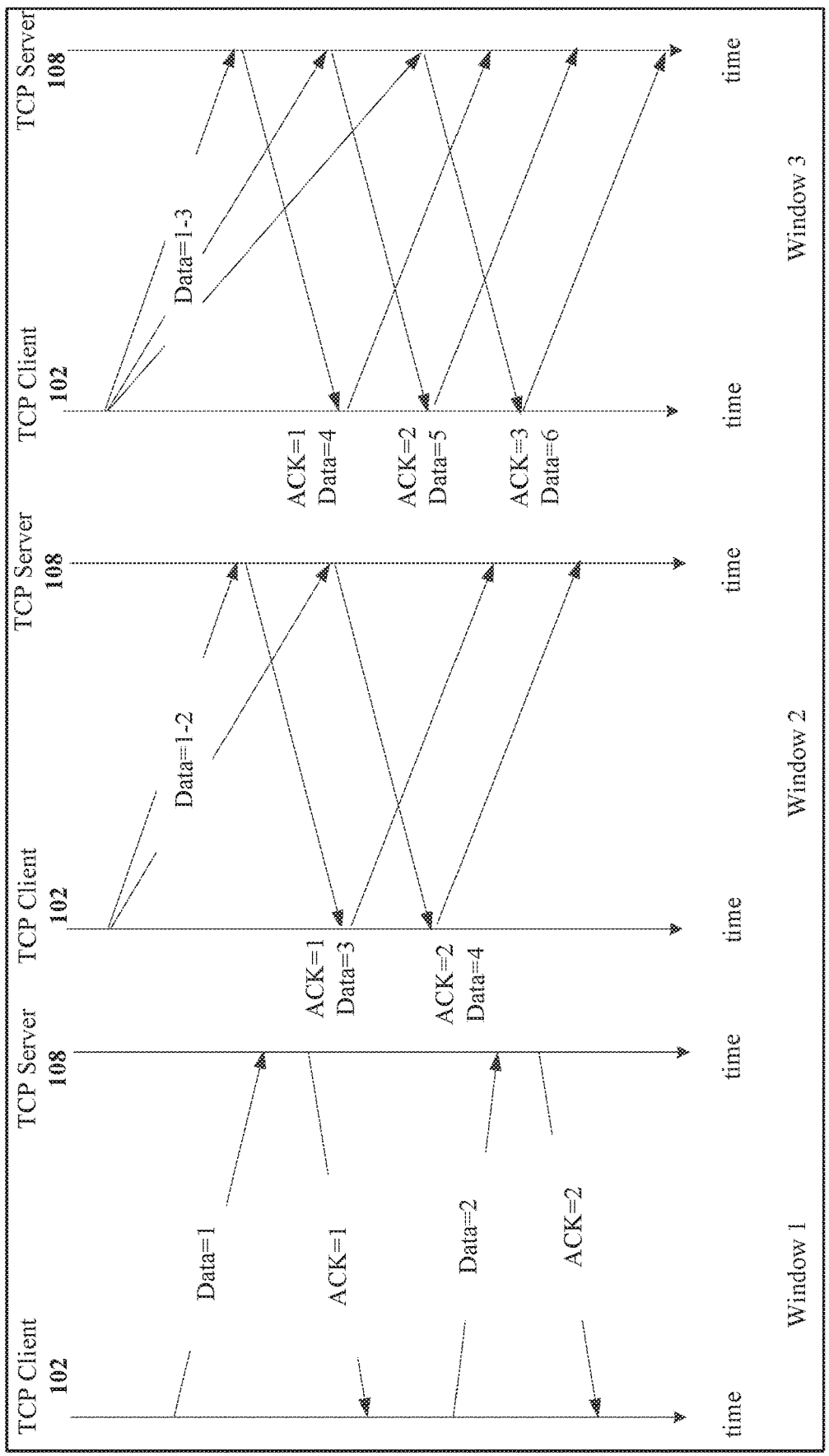
FIG. 10 shows the sliding window protocol used to provide end-to-end flow control for the data transmission between TCP client and TCP server, after the TCP connection is established

FIG. 10 shows the sliding window protocol used to provide end-to-end flow control for the data transmission between TCP client 102 and TCP server 108, after the TCP connection is established as described relative to FIG. 6B. Once the state of the TCP connection between a client and server which defines a stream goes into the ESTABLISHED state, the data transmission begins. The TCP data transmission for a single stream is explained next. TCP client 102 is the sender and initiates the data transmission. TCP client 102 uses sliding windows with sequence numbers and acknowledgement numbers for reliable data transmission to TCP server 108. TCP client 102 keeps transmitting the number of segments in the window. Once the segments in the window have been transmitted, more segments will be sent after an acknowledgement is received for the previous segments. TCP server 108 uses the receive window size to tell TCP client 102 how much data it can receive. TCP client 102 uses the congestion window size, which is determined by measuring the round trip time for packets between the client and server, to transmit segments. These values are maintained in the FSM.

To enable flow control, the TCP data transmission on a stream proceeds in two phases: the initial phase is called slow start and the next phase is called congestion avoidance as specified in IETF RFC 2581 and uses two state variables, the congestion window and the receiver window. The TCP sender maintains the congestion window variable 'cwnd'—the maximum amount of data that the TCP sender can transmit before receiving an acknowledgement, in the TCP PCB for every stream. The TCP receiver maintains the receiver window variable 'rcv_wnd'—a measure of the maximum data buffering capacity at the receiver, in the TCP PCB for every stream and advertises it to the TCP sender. Another state variable, the slow start threshold 'ssthresh', is used by the TCP sender to determine whether to use the slow-start or the congestion avoidance algorithm to control data transmission. The TCP sender starts the data transmission in the slow-start phase by sending IW, the initial value of cwnd, as specified in RFC 2581, with maximum segment size (MSS).

IW=min((4*MSS), max((2*MSS), 4380))

The TCP sender increments the cwnd by MSS bytes for each TCP ACK segment received that acknowledges receipt of new data at the receiver. The slow-start phase ends when cwnd exceeds ssthresh. The ssthresh is an empirically determined value that is optimal and specific to the network under test. Pseudo code for making this determination is listed next.

while (cwnd<ssthresh)
slow_start( )
while (cwnd>ssthresh)
congestion_avoidance( )

In the congestion avoidance phase, the cwnd is incremented according to the formula listed next, for each TCP ACK segment that acknowledges receipt of new data at the receiver.

if (TCP ACK received)
cwnd+=(MSS*MSS)/cwnd

If the TCP sender detects segment loss using the retransmission timer, the value for ssthresh is determined as listed next.

ssthresh=max((2*MSS), min((cwnd/2), rcv_wnd))

After retransmitting the lost segment, the TCP sender uses the slow-start algorithm to increase the value of cwnd until its value reaches the new value of ssthresh, and then enters the congestion avoidance phase of data transmission. As can be seen from the above process where TCP data transmission over a single stream is explained, the methods used for TCP data transmission when the number of streams are very large is not scalable.

The disclosed method scales TCP data transmission over a large number of streams. A data structure called 'packet transmit sequence entry' is created, per transmit core, which consists of the following layout:

```
/* State enumeration of the transmit sequence entry */
typedef enum __pxs_state {
    PXS_TEST_DONE = 0,
    PXS_TEST_RUNNING,
    PXS_TEST_ENDING,
    PXS_TEST_STARTING,
} pxs_state_e;
```

Information is kept in packet transmit sequence entries. Packet-transmit sequence entries consist of frame data and an associated TCP segment that has been pre-filled by the control plane at the start of test. The frame data has information about the TCP segment, including various pointers used to update the frame each time it is transmitted.

Figure 11:
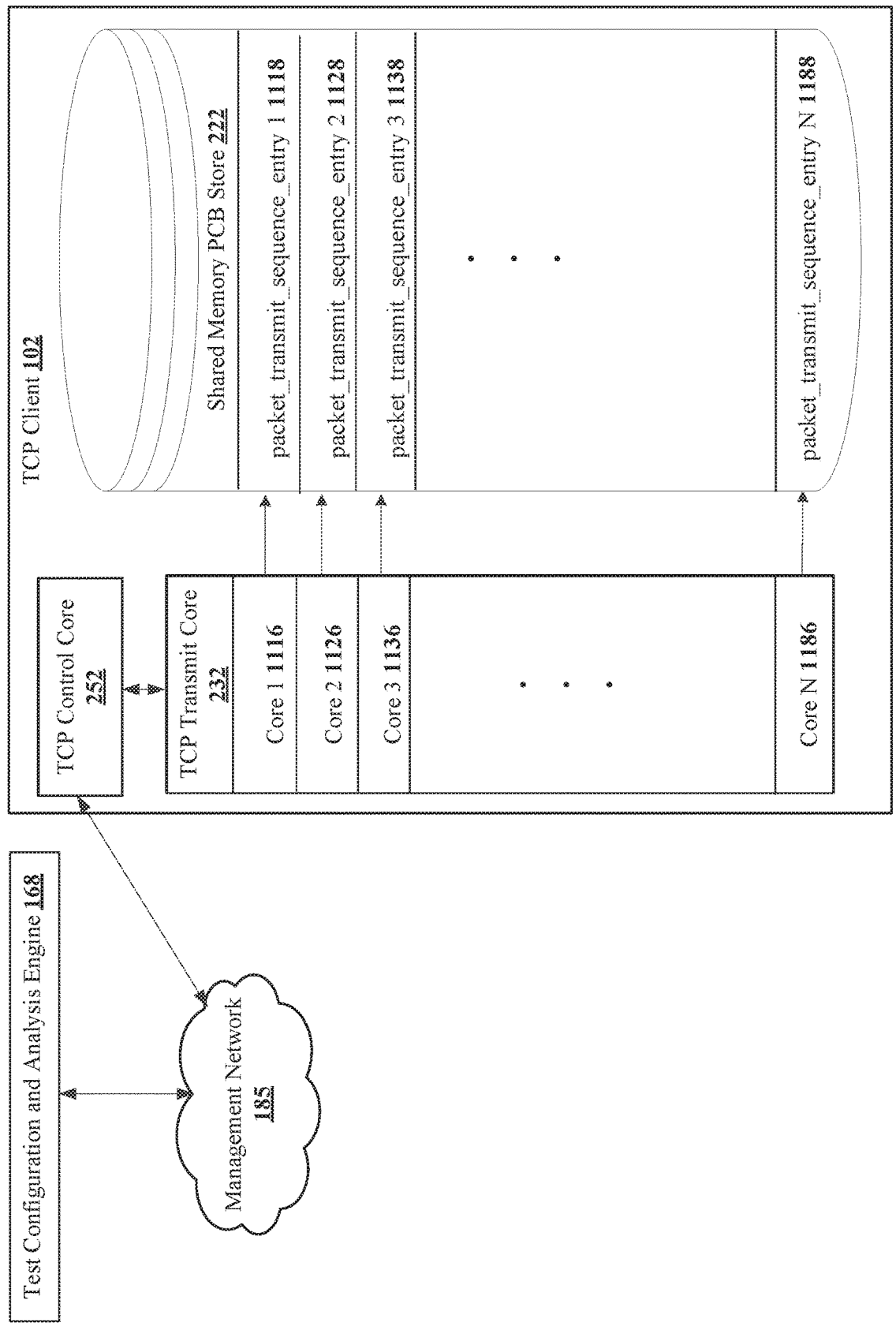
FIG. 11 shows examples of packet transmit sequence entry for each transmit core allocated in shared memory by TCP control core as part of the test initialization.

FIG. 11 shows examples of the packet_transmit_sequence_entry 1118, 1128, 1138, 1188 for each transmit core 1116, 1126, 1136, 1186 allocated in shared memory by TCP control core 252 as part of the test initialization when the test request is received from the TCAE 168 via management network 185. The layout of the packet transmit sequence entry is listed next in the packet_transmit_sequence_entry_t data structure, which maintains information about stream transmission which includes bit rates, transmission window sizes, and a linked list of stream information blocks represented as pointers to data_queue_t. The data structure for the pointers is listed next.

```
typedef struct __data_queue {
    uint64_t packet_len_min:16;
    uint64_t packet_len_max:16;
    uint64_t ip_checksum_zero_length:16;
    uint64_t ip_offset:8;
    uint64_t :8;
    uint64_t total_len_addr;      /* uint16_t * pointer to the total length in the */
                                  /* associated Ethernet frame (IP header) */
    void *pcb;                    /* Pointer to associated PCB for this TCP stream */
    uint64_t ip_checksum_addr;    /* uint32_t * pointer to the IP checksum in the */
                                  /* associated Ethernet frame (IP header) */
    uint64_t packet;              /* char * pointer to the associated Ethernet frame */
    uint64_t next_pckt;           /* void * pointer to next data_queue_t (circular list) */
    uint64_t packet_len :16;
    uint64_t stream_num: 16;
} data_queue_t;
typedef struct __packet_transmit_sequence_entry { /* total 128 bytes
    /* pxs_state_flag: indicates the state of this transmit_sequence */
    uint64_t pxs_state_flag:8;
    /* test_id: each test case is assigned a test_id when the test case is loaded. */
    /* The transmit_sequence for a test case keep the test_id for a test case */
    uint64_t test_id:8;
    uint64_t test_type:8;
    uint64_t test_mode:8;
```

```
/* < flag: non-zero indicates test stream requires in-order TX frames */
uint64_t in_order_tx:8;
uint64_t :24;
/* current_window: keep the start time of current window in unit of cycles */
uint64_t current_window;
/* delta_window: keep the window size in unit of cycles */
uint64_t delta_window;
/* Transmit_sequence uses small window sizes to generate frames. */
/* On high rates it makes big differences between actual rate and requested one */
/* the following two variables are used to adjust rate */
/* adj_current_window: keep start time of current window in unit of cycles */
uint64_t adj_current_window;
/* adj_delta_window: keep the window size in unit of cycles */
uint64_t adj_delta_window;
/* transmit_rate: the number of bytes needs to be transmitted per window */
uint64_t transmit_rate:32;
/* remaining_bytes: the number of bytes needs to be transmitted */
uint64_t remaining_bytes:32;
uint64_t unique_test_id;
/** data sequence blocks */
data_queue_t *data_seq_head;
data_queue_t *data_seq_tail;
/** next transmit sequence entry in the transmit sequence table */
struct _packet_transmit_sequence_entry *next;
uint64_t packet_count;
/* bursts remaining and data for tests that have more than one stream */
uint64_t bursts_remaining: 16;
uint64_t : 16;
uint64_t stream_ind:8;
uint64_t first:1;
uint64_t :23;
} packet_transmit_sequence_entry_t;
```

Figure 12:
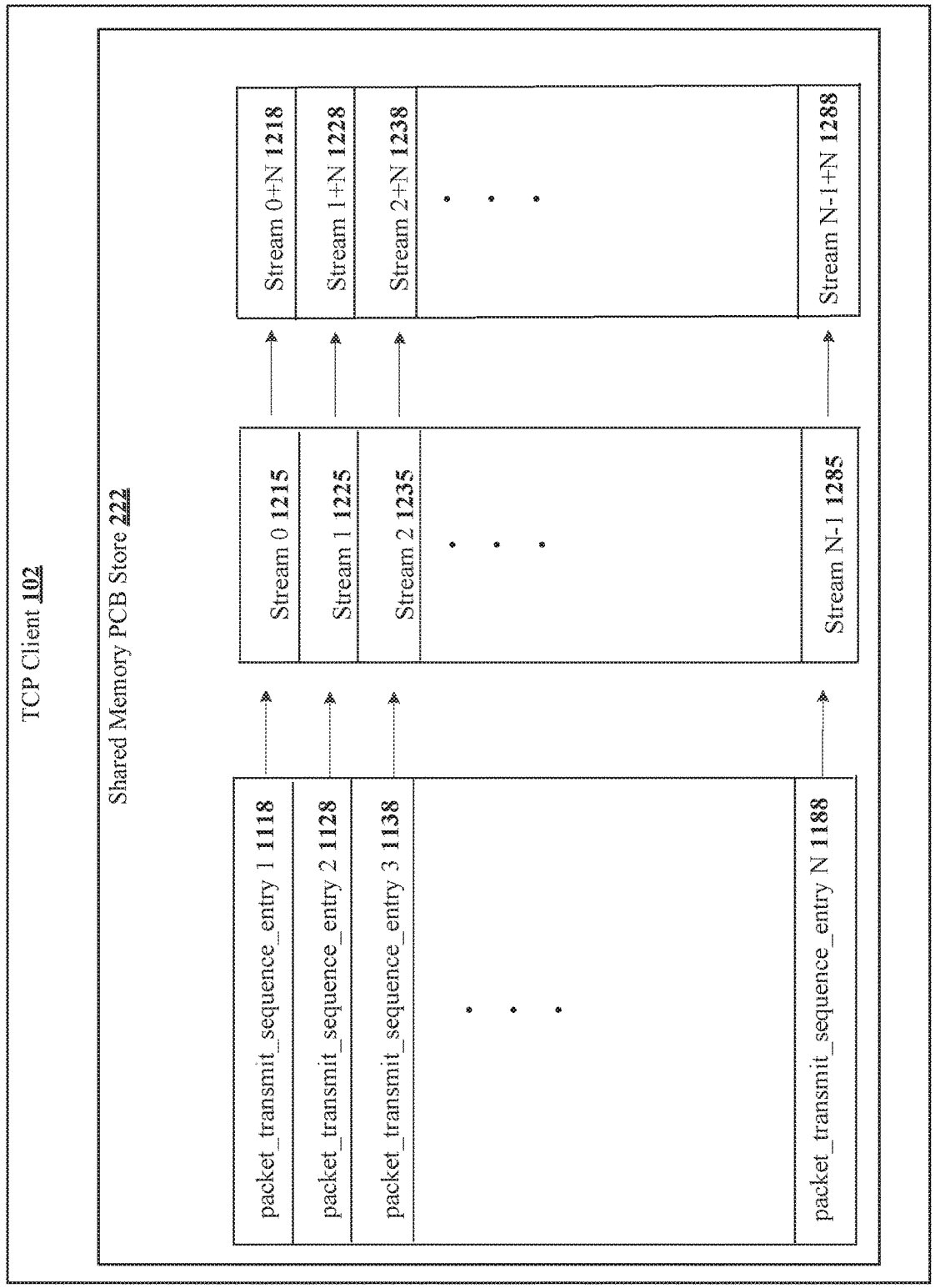
FIG. 12 shows a packet transmit sequence entry example, implemented using the layout of data sequence blocks.

FIG. 12 shows a packet transmit sequence entry example, implemented using the layout of data sequence blocks data_queue_t listed earlier, with packet_transmit_sequence_entry 1 1118 to stream 0 1215, and stream 0 1215 to stream 0+N 1218; similarly, packet_transmit_sequence_entry 2 1128 to stream 1 1225, and stream 1 1225 to stream 1+N 1228; packet_transmit_sequence_entry 3 1138 to stream 2 1235, and stream 2 1235 to stream 2+N 1238; and packet_transmit_sequence_entry N 1188 to stream N−1 1285, and stream N−1 1285 to stream N−1+N 1288.

Figure 13:
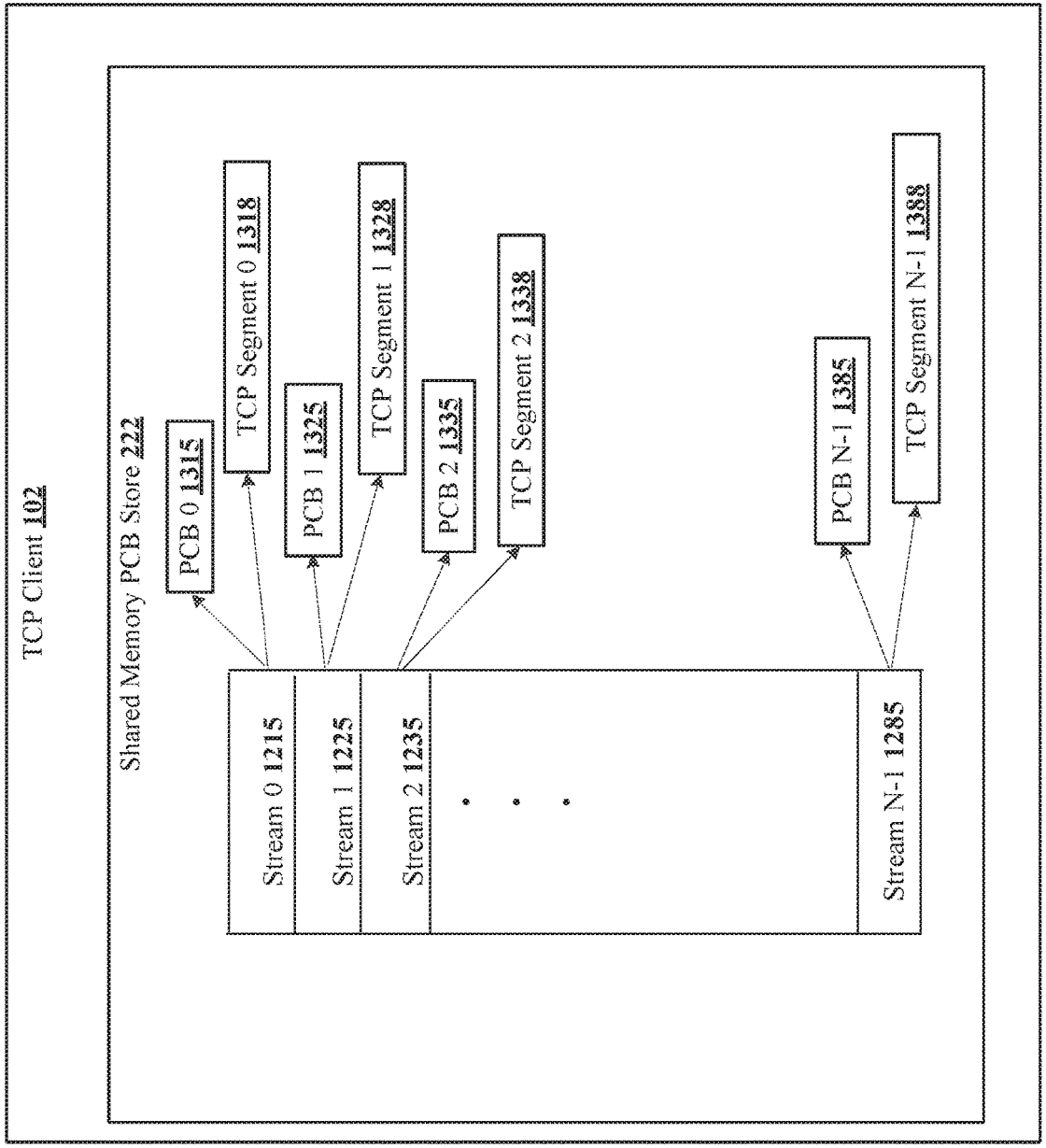
FIG. 13 illustrates the pointers to PCB and TCP segments, in shared memory, for each stream.

FIG. 13 illustrates the pointers to PCB and TCP segments, in shared memory, for each stream. TCP client 102 shared memory PCB store 222 maintains a pointer to the PCB for each TCP stream, to enable the distributed TCP state machine across control cores, transmit cores and receive cores and timer cores. Stream 0 maps to PCB 0 1315, stream 1 maps to PCB 1 1325, stream 2 1235 maps to PCB 2 1335, and stream N−1 1285 maps to PCB N−1 1385. A pointer to the complete TCP data segment is pre-configured by the control plane, with all the information about the TCP stream including Ethernet header, IP header including the pre-calculated IP header checksum and TCP header information with the pre-calculated TCP header and data checksum, since the TCP payload is test information which is a sequence of pseudorandom generated bytes: TCP segment 0 1318 for stream 0 1212, TCP segment 1 1328 for stream 1 1225, TCP segment 2 1338 for stream 2 1235, and TCP segment N−1 1388 for stream N−1 1285. The stream data blocks need to be multiplexed very carefully across the per-core packet transmit sequence entries to ensure scalability and high performance. As shown in FIG. 12, the packet_transmit_sequence_entry 1 1118 on core 1 1116 points to a list of stream data blocks where the first entry is for stream 0 1215 and the second entry is for stream 0+N 1218 where N is the number of transmit cores. Similarly the packet_transmit_sequence_entry 2 1128 on core 2 1126 points to a list of stream data blocks where the first entry is for stream 1 1225 and the second entry is for stream 1+N 1228 where N is the number of transmit cores. This ensures that when core 1 1116 is transmitting the data for stream 0 1215, core 2 1126 is transmitting the data for stream 1 1225 concurrently and similarly for all the streams and transmit cores. This ensures that data transmission for stream 1 1225 is not waiting for data transmission for stream 0 1215 to complete. This ensures the high scalability and high performance for a large number of streams which could all be transmitting at different data rates.

Figure 14:
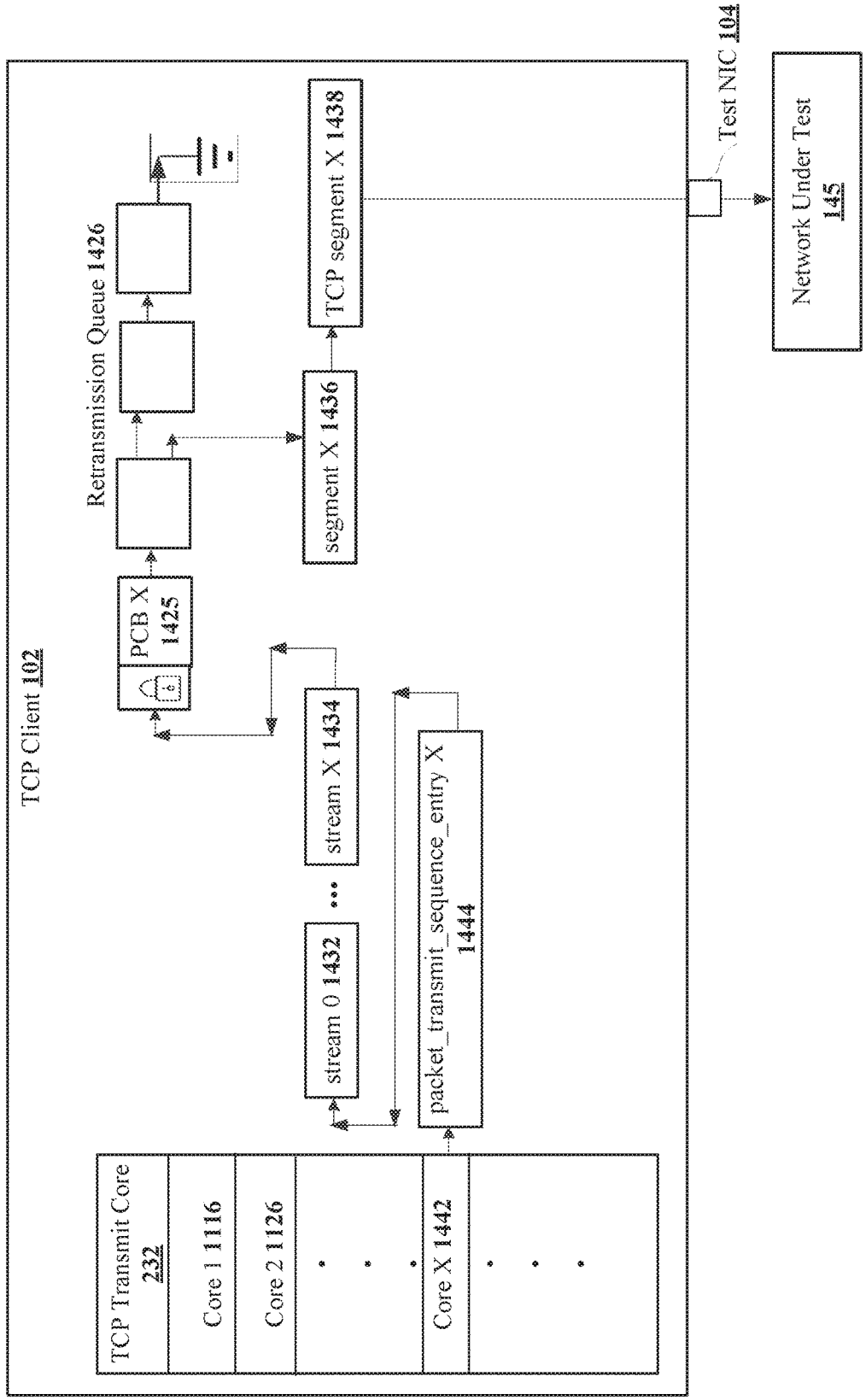
FIG. 14 shows that N transmit cores at the TCP client can transmit data for N streams concurrently without waiting for data transmission for each stream to complete, using the disclosed shared memory PCB store.

FIG. 14 shows that N transmit cores can transmit data for N streams concurrently without waiting for data transmission for each stream to complete, using the disclosed shared memory PCB store. TCP client 102 transmit core X 1442 accesses packet_transmit_sequence_entry X 1444 for data transmission. The stream X data block 1434 is then accessed. The spinlock for PCB X 1425 is checked and if it is free, it is acquired by locking it. The state variables, including cwnd, rcv_wnd and ssthresh, are checked and updated accordingly as described earlier. If the cwnd indicates that the data can be transmitted for this stream then PCB X 1425 is freed. Then transmit core X 1442 puts segment X 1436 on the retransmission queue 1426 of PCB X 1425 and begins the data transmission of the pre-populated TCP segment for stream X 1438 based on information in the packet_transmit_sequence_entry X 1444. This procedure shows that all N transmit cores can transmit data for N streams concurrently without needing to wait for data transmission for each stream to complete.

Figure 15:
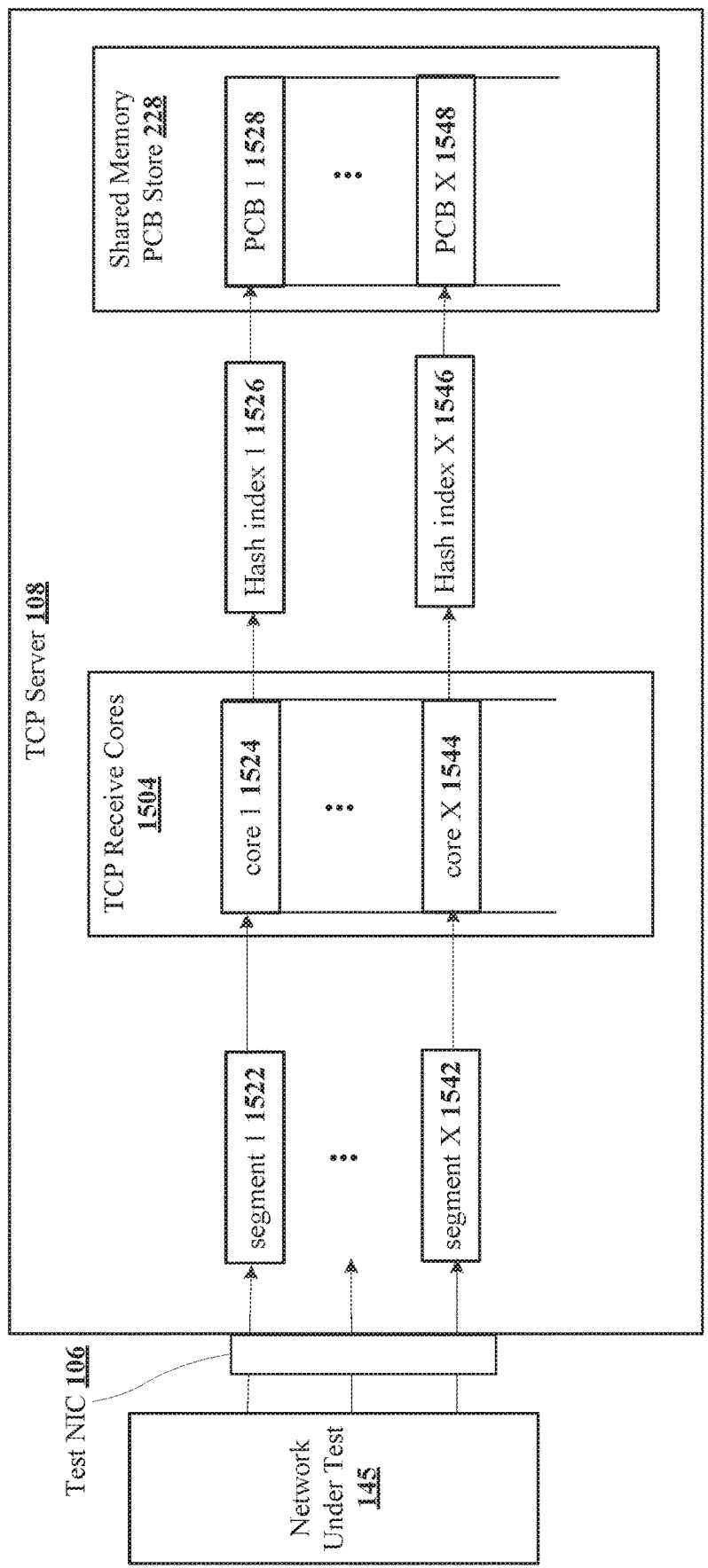
FIG. 15 shows that N receive cores at the TCP server can receive data for N streams concurrently and process the information simultaneously without waiting for processing of info for each stream to complete, using the disclosed shared memory PCB stores.

FIG. 15 shows that N receive cores at the TCP server can receive data for N streams concurrently and process the information simultaneously without waiting for processing of info for each stream to complete, using the disclosed shared memory PCB stores. As the TCP segment X 1542 for stream X arrives at the TCP server 108, from the network under test 145, it is received by core X 1544—one of the N TCP receive cores 1504 that have been designated for receiving. The data in TCP segment X is used to get the hash index X 1546 to access the PCB X hash in shared memory and the spinlock for PCB X 1548 is checked and if it is free, it is acquired by locking it. The state variables in PCB X 1548 are updated so that TCP ACK can be sent for this stream and statistics collected and then PCB X 1548 is freed. This ensures that all N receive cores can receive data for N streams concurrently and process the information simultaneously without needing to wait for the processing of information for each stream to complete.

Figure 16:
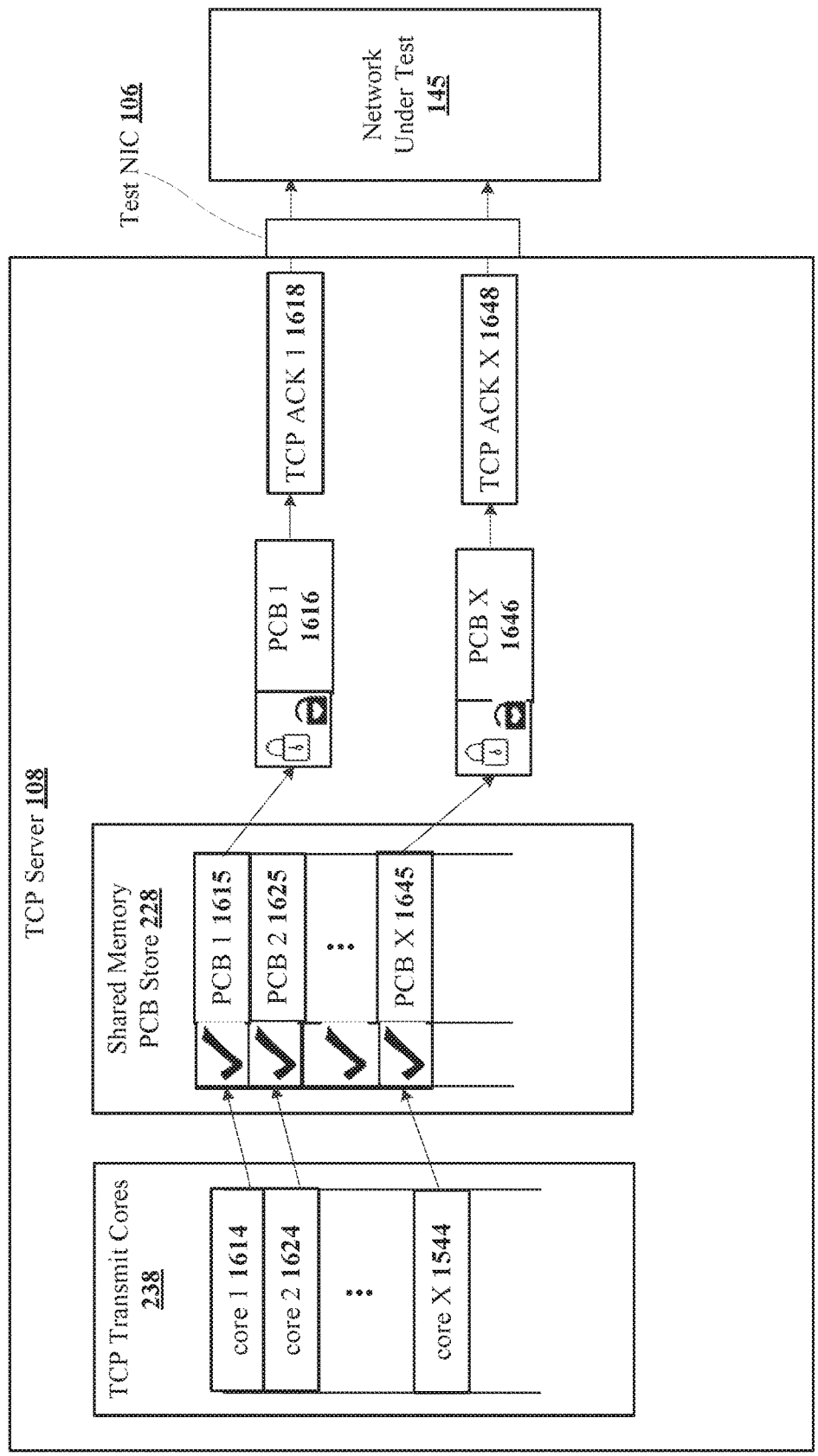
FIG. 16 shows the N transmit cores on TCP server checking for the spinlocks on each of the PCBs.

FIG. 16 shows the N TCP transmit cores 238 on TCP server 108 checking for the spinlocks on each of the PCBs. For example, if PCB X 1645 is free, it is acquired by locking it. The state variables in PCB X 1645 are checked and if they indicate that a TCP ACK is to be transmitted then the TCP acknowledgement 1648 is sent and the spinlock for PCB X 1646 is freed.

Figure 17:
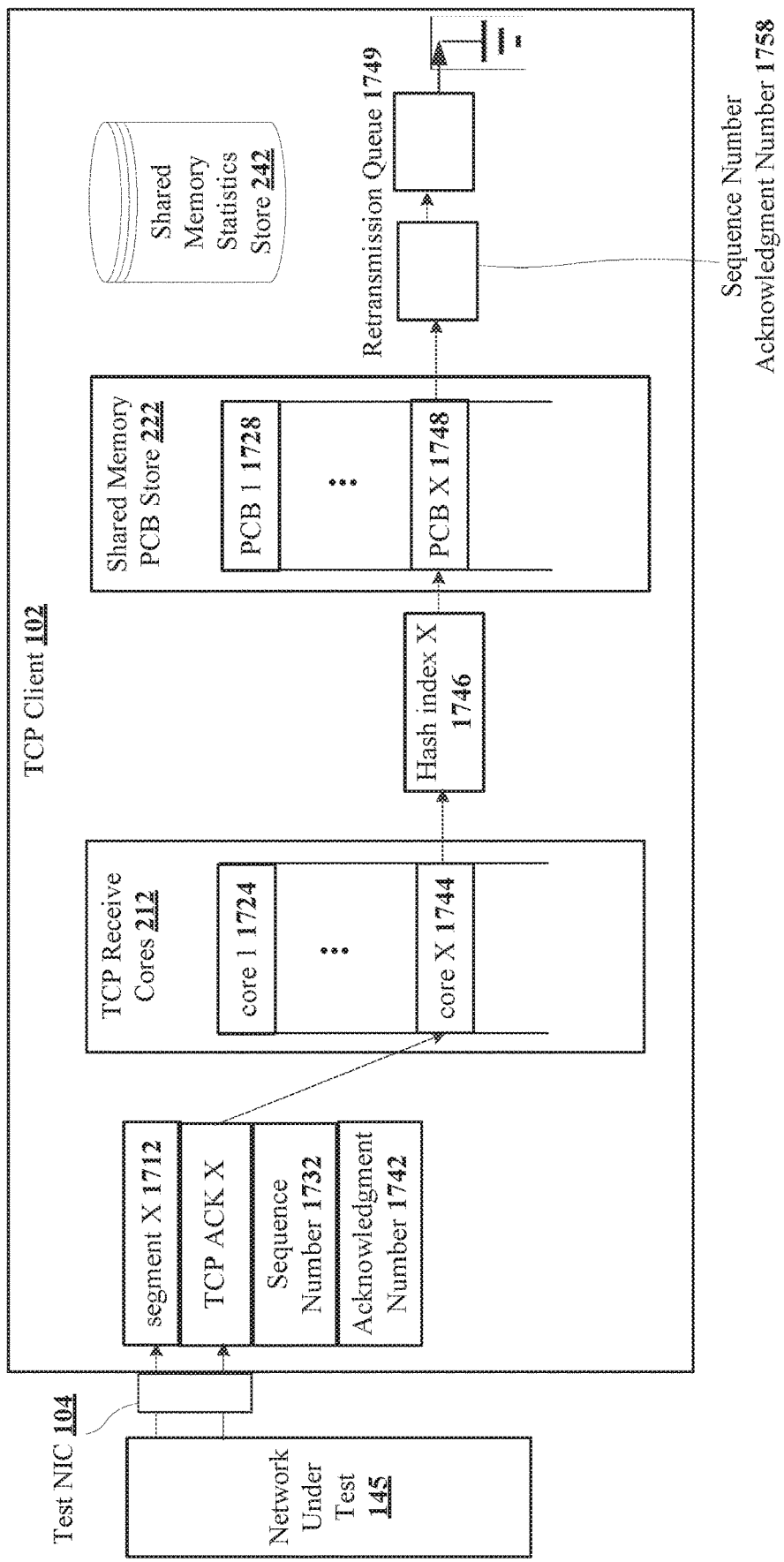
FIG. 17 shows that N receive cores at the TCP client can receive data for N streams concurrently and process the information simultaneously without needing to wait for the processing of information for each stream to complete.

FIG. 17 shows that N receive cores can receive data for N streams concurrently and process the information simultaneously without needing to wait for the processing of information for each stream to complete. As the TCP ACK segment X 1712 for stream X arrives at TCP client 102 it is received by receive core X 1744 of the N TCP receive cores 212 that have been designated for receiving. The data in TCP segment X 1712 is used to get the hash index X 1746 to access the PCB hash table in shared memory PCB store 222 and the spinlock for PCB X 1748 is checked and if it is free, it is acquired by locking it. The state variables in PCB X 1748 are updated. The segments in retransmission queue 1749 with sequence number 1758 less than the acknowledgement number 1742 in the received TCP ACK segment X 1712 are freed. The statistics for this stream are collected and updated in shared memory statistics store 242, and then PCB X 1748 is freed. This ensures that all N receive cores can receive data for N streams concurrently and process the information simultaneously without having to wait for the processing of information for each stream to complete.

Figure 18:
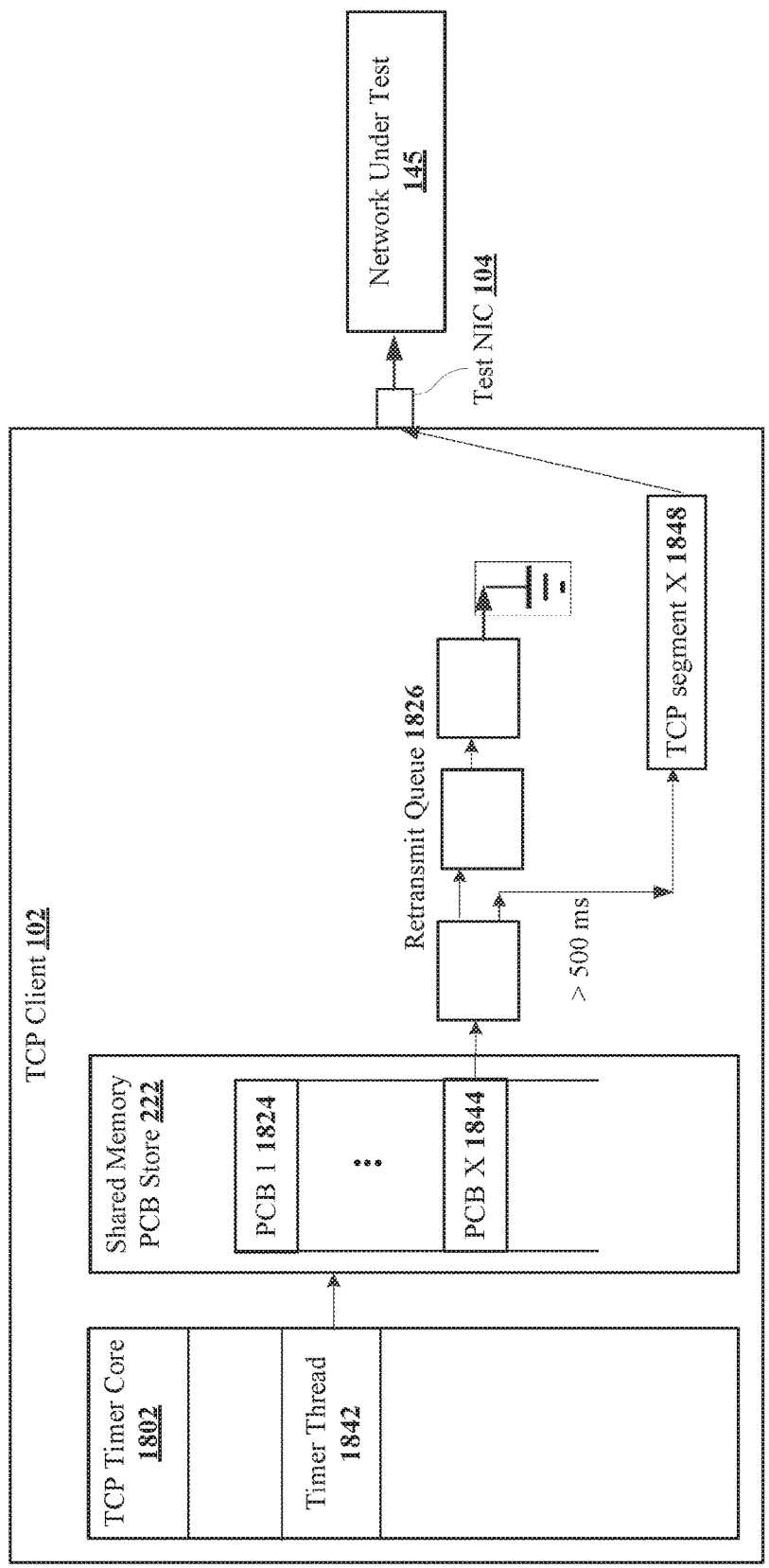
FIG. 18 shows the effects of the timer thread, from the TCP client perspective, for the disclosed session processing architecture for conducting numerous TCP sessions during testing of a network under test.

FIG. 18 shows the effects of the timer thread, from the TCP client perspective, for the disclosed session processing architecture for conducting numerous TCP sessions during testing of a network under test. In one implementation, every millisecond, the timer thread running on timer core 1802 on TCP client 102, wakes up. It traverses the list of PCBs by acquiring them after locking them. It updates some housekeeping variables stored. Every 500 milliseconds, it also checks for any TCP segments that are in retransmission queue 1826 and transmits them in TCP segment X 1848. The spinlocks on the PCBs are then freed.

Figure 19:
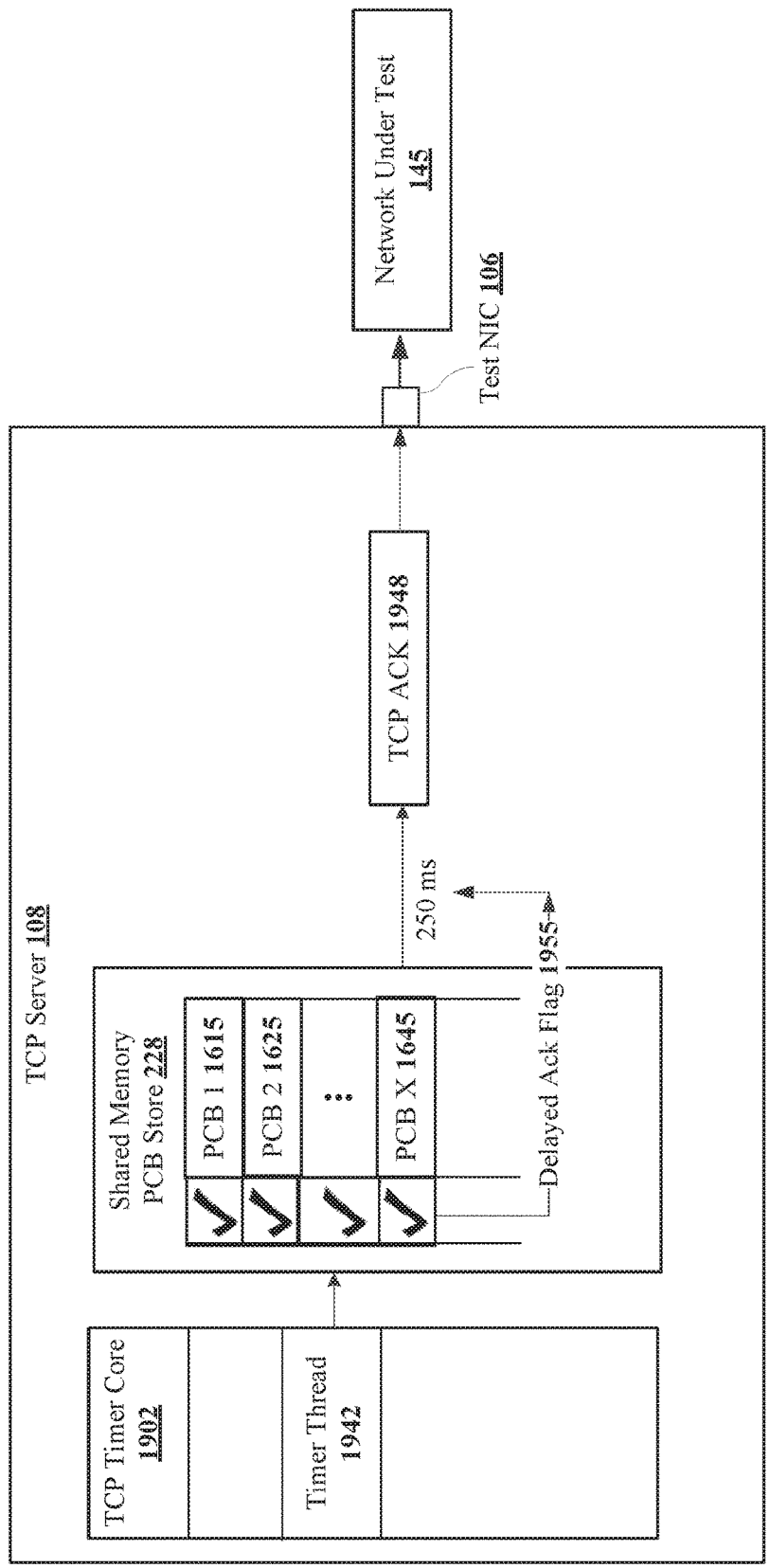
FIG. 19 shows the effects of the timer thread, from the TCP server perspective, for the disclosed session processing architecture for conducting numerous TCP sessions during testing of a NUT.

FIG. 19 shows the effects of the timer thread, from the TCP server perspective, for the disclosed session processing architecture for conducting numerous TCP sessions during testing of a network under test. Every millisecond timer thread 1942 running on timer core 1902 on TCP server 108 wakes up. It traverses the list of PCBs in shared memory PCB store 228 by acquiring them after locking them. It updates some housekeeping variables stored. Every 250 milliseconds, it also checks for set delayed ACK flag 1955 and transmits TCP ACK 1948 if the flag is set. The spinlocks on the PCBs are then freed.

To enhance data rate performance and scalability in terms of the number of streams that can be supported, the TCP state machine software executing in user space is running on all the CPU cores at the same time in parallel. This leverages the Level 1 instruction cache (I-cache) and data cache (D-cache) that each of these CPU cores maintain separately. The CPU core that is executing code to process a particular stream must obtain the atomic lock of the PCB associated with that stream. Once this spinlock is obtained, the CPU core continues with the processing of the packets associated with the stream. When the CPU core is done processing, the atomic spinlock is released. If a CPU core attempts to access the spinlock of a stream PCB that is already locked, it does not have to wait, as would be necessary if using a conventional mutual exclusion (mutex) lock, and can continue to process other stream PCBs for which it can acquire the spinlock.

Performance is enhanced by leveraging multi-core CPU architectures for conducting numerous TCP sessions during testing of a network under test, which can improve the performance and scalability of the network.

Computer System

Figure 20:
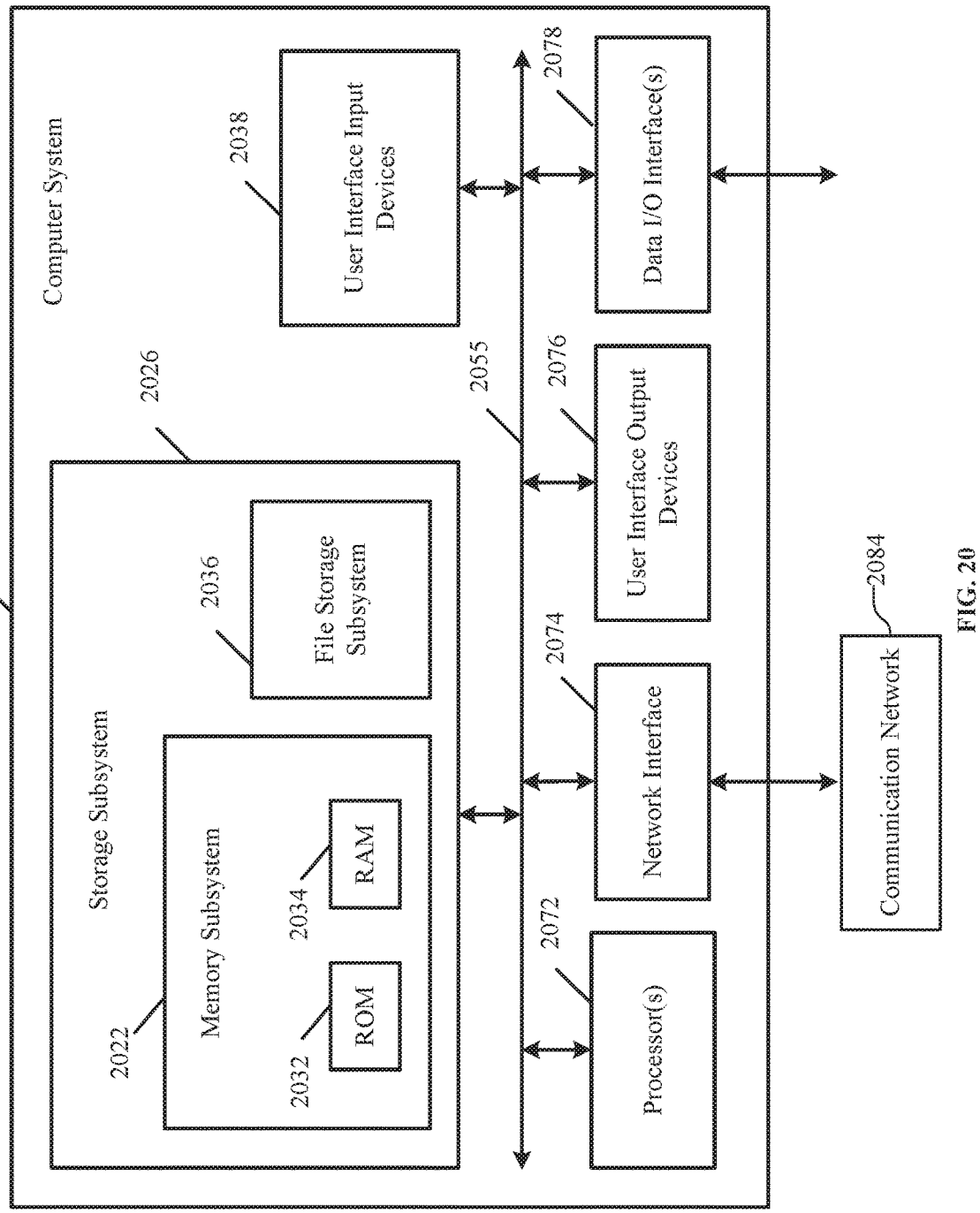
FIG. 20 depicts a block diagram of an exemplary system for TCP session processing and measurement for conducting numerous TCP sessions during testing of a network-under-test, according to one implementation of the technology disclosed.

FIG. 20 is a simplified block diagram of a computer system 2000 that can be used to implement a transmission control protocol (TCP) session processing method for conducting numerous TCP sessions during testing of a network under test (NUT), according to one implementation of the technology disclosed.

Computer system 2000 includes at least one central processing unit (CPU) 2072 that communicates with a number of peripheral devices via bus subsystem 2055. These peripheral devices can include a storage subsystem 2010 including, for example, memory devices and a file storage subsystem 2036, user interface input devices 2038, user interface output devices 2076, and a network interface subsystem 2074. The input and output devices allow user interaction with computer system 2000. Network interface subsystem 2074 provides an interface to outside networks, including an interface to corresponding interface devices in other computer systems.

In one implementation, the network hosts of FIG. 2 can be communicably linked to the storage subsystem 2010 and the user interface input devices 2038. User interface input devices 2038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2000.

User interface output devices 2076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2000 to the user or to another machine or computer system.

Storage subsystem 2010 stores programming and data constructs that provide the functionality of some or all of the modules and methods described herein. These software modules are generally executed by deep learning processors 2078.

Memory subsystem 2022 used in the storage subsystem 2010 can include a number of memories including a main random access memory (RAM) 2032 for storage of instructions and data during program execution and a read only memory (ROM) 2034 in which fixed instructions are stored. A file storage subsystem 2036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2036 in the storage subsystem 2010, or in other machines accessible by the processor.

Bus subsystem 2055 provides a mechanism for letting the various components and subsystems of computer system 2000 communicate with each other as intended. Although bus subsystem 2055 is shown schematically as a single bus, alternative implementations of the bus subsystem can use multiple busses.

Computer system 2000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2000 depicted in FIG. 20 is intended only as a specific example for purposes of illustrating the preferred embodiments of the present invention. Many other configurations of computer system 2000 are possible having more or less components than the computer system depicted in FIG. 20.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

Some Particular Implementations

Some particular implementations and features are described in the following paragraphs.

In one implementation, a disclosed transmission control protocol (TCP) session processing architecture for conducting numerous TCP sessions during testing of a network-under-test (NUT) includes multiple processor cores running allocated to TCP session handling, with some of the cores sharing a processor die. The disclosed architecture also includes program instructions configured to distribute processing of each TCP session across multiple cores, wherein a first set of cores is allocated to handle TCP session control, a second set of cores is allocated to handle transmission of TCP packets in a session, and a third set of cores is allocated to handle receipt of TCP packets in the session. The architecture further includes a shared memory accessible to the first, second and third sets of cores, that holds protocol control blocks (PCBs) for each of the numerous TCP sessions during the testing of the NUT, wherein the PCBs include state information that is updated during set-up and operation of a TCP session. Update access to each of the PCBs is controlled by an atomic spinlock processor instruction that each state machine running on any of the first, second and third sets of cores must engage to secure the update access to a respective PCB in order to proceed with state processing of its respective TCP session.

This architecture and other implementations of the technology disclosed can include one or more of the following features and/or features described in connection with additional architectures disclosed. In the interest of conciseness, the combinations of features disclosed in this application are not individually enumerated and are not repeated with each base set of features.

For one implementation of the disclosed TCP session processing architecture, the first set of cores allocated to TCP session control further handles starting new streams and establishing a three-way handshake for each new session. In some implementations the first set of cores is responsible for communicating with the test configuration and analysis engine and parsing the TCP streams and collecting and sending test results. In some implementations, the disclosed TCP control thread is also responsible for setting up, using special operating system commands, a shared memory protocol control block (PCB) store, shared memory statistics store and shared memory TCP segment store in shared memory so that the stores are accessible to all client cores running the application.

In some implementations of the disclosed TCP session processing architecture, the numerous TCP sessions test one thousand to one million streams transmitted from the second set of cores to the NUT, responses to which are received at the third set of cores from the NUT.

For some implementations of the disclosed TCP session processing architecture, the PCBs for each of the numerous TCP sessions store unique identifiers of streams, the states of the streams and a unique atomic spinlock for each session to guarantee exclusive access to the PCB that is accessible from the first, second and third sets of cores.

In one disclosed implementation of the TCP session processing architecture, the atomic spinlock processor instruction is a processor supported instruction that determines availability of a lock on the PCB and sets the lock in a single clock cycle.

For some implementations of the disclosed TCP session processing architecture, the numerous TCP sessions test are conducted between emulated endpoint clients and a server on the NUT. In other implementations of the TCP session processing architecture the numerous TCP sessions test are conducted between numerous emulated endpoint clients and a plurality of servers on the NUT.

In some implementations of the disclosed TCP session processing architecture, the multiple cores include four cores to 32 cores.

The technology disclosed can be practiced as a system, method, or article of manufacture. One or more features of an implementation can be combined with the base implementation. Implementations that are not mutually exclusive are taught to be combinable. One or more features of an implementation can be combined with other implementations.

In another implementation, a disclosed TCP session processing method for conducting numerous TCP sessions during testing of a network under test (NUT), includes distributing processing of each TCP session, among the numerous TCP sessions during the testing of the NUT, across multiple cores allocated to TCP session handling, some of the cores sharing a processor die, and each of the cores running a state machine. For the disclosed method; a first set of cores is allocated to handle TCP session control, a second set of cores is allocated to handle transmission of TCP packets in a session, and a third set of cores is allocated to handle receipt of TCP packets in the session. The disclosed method also includes each of the state machines running on the cores accessing a shared memory accessible to the first, second and third sets of cores, that holds protocol control blocks (PCBs) for each of the numerous TCP sessions, which PCBs include state information that is updated by the state machines during set-up and operation of a TCP session. The disclosed method further includes each of the state machines gaining update access to each of the PCBs by invoking an atomic spinlock processor instruction to secure the update access to a respective PCB in order to proceed with state processing of its part of a respective TCP session; and conducting the numerous TCP sessions during the testing of the NUT.

In another implementation, a disclosed system includes one or more processors coupled to memory, the memory loaded with computer instructions, when executed on the processors, implement actions of the disclosed method described supra.

In yet another implementation a disclosed tangible non-transitory computer readable storage media impressed with computer program instructions that, when executed on a processor, cause hardware to support conducting numerous transmission control protocol (TCP) sessions during testing of a network under test (NUT), implementing the disclosed methods and architectures described supra.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim as follows:

1. A transmission control protocol (TCP) session processing architecture for conducting numerous TCP sessions during testing of a network-under-test (NUT), including:
   multiple processor cores running allocated to TCP session handling, some of the cores sharing a processor die;
   program instructions, stored in a memory of the TCP session processing architecture and configured to distribute processing of each TCP session across multiple cores,
   wherein a first set of cores is allocated to handle TCP session control, and a second set of cores is allocated to handle transmission of TCP packets in a session;
   a shared memory accessible to the first and second sets of cores, that holds protocol control blocks (PCBs) for each of the numerous TCP sessions during the testing of the NUT wherein the PCBs include state information that is updated during set-up of a TCP session; and
   wherein update access to each of the PCBs is controlled by an atomic spinlock processor instruction that each state machine running on any of the first and second sets of cores must engage to secure the update access to a respective PCB in order to proceed with state processing of its respective TCP session.

2. The TCP session processing architecture of claim 1, wherein the first set of cores allocated to TCP session control further handles starting new streams and establishing a three-way handshake for each new session.

3. The TCP session processing architecture of claim 1, wherein the numerous TCP sessions test one thousand to one million streams transmitted from the second set of cores to the NUT.

4. The TCP session processing architecture of claim 1, wherein the PCBs for each of the numerous TCP sessions store unique identifiers of streams, the states of the streams and a unique atomic spinlock for each session to guarantee exclusive access to the PCB that is accessible from the first and second sets of cores.

5. The TCP session processing architecture of claim 1, wherein the atomic spinlock processor instruction is a processor supported instruction that determines availability of a lock on the PCB and sets the lock in a single clock cycle.

6. The TCP session processing architecture of claim 1, wherein the numerous TCP sessions tests are conducted between emulated endpoint clients and a server on the NUT.

7. The TCP session processing architecture of claim 1, wherein the numerous TCP sessions tests are conducted between numerous emulated endpoint clients and a plurality of servers on the NUT.

8. The TCP session processing architecture of claim 1, wherein the multiple cores include four cores to 32 cores.

9. A transmission control protocol (TCP) session processing method for conducting numerous TCP sessions during testing of a network under test (NUT), including:
   distributing processing of each TCP session, among the numerous TCP sessions during the testing of the NUT, across multiple cores allocated to TCP session handling, some of the cores sharing a processor die, and each of the cores running a state machine;
   wherein a first set of cores is allocated to handle TCP session control and a second set of cores is allocated to handle transmission of TCP packets in a session;
   each of the state machines running on the cores accessing a shared memory accessible to the first and second sets of cores, that holds protocol control blocks (PCBs) for each of the numerous TCP sessions, wherein the PCBs include state information that is updated by the state machines during set-up of a TCP session;
   each of the state machines gaining update access to each of the PCBs by invoking an atomic spinlock processor instruction to secure the update access to a respective PCB in order to proceed with state processing a part of a respective TCP session; and
   conducting the numerous TCP sessions during the testing of the NUT.

10. The TCP session processing method of claim 9, wherein the first set of cores allocated to TCP session control further handles starting new streams and establishing a three-way handshake for each new session.

11. The TCP session processing method of claim 9, wherein the numerous TCP sessions test one thousand to one million streams transmitted from the second set of cores to the NUT.

12. The TCP session processing method of claim 9, wherein the PCBs for each of the numerous TCP sessions store unique identifiers of streams, the states of the streams and a unique atomic spinlock for each session to guarantee exclusive access to the PCB that is accessible from the first and second sets of cores.

13. The TCP session processing method of claim 9, wherein the atomic spinlock processor instruction is a processor supported instruction that determines availability of a lock on the PCB and sets the lock in a single clock cycle.

14. The TCP session processing method of claim 9, wherein the numerous TCP sessions tests are conducted between emulated endpoint clients and a server on the NUT.

15. The TCP session processing method of claim 9, wherein the numerous TCP sessions tests are conducted between numerous emulated endpoint clients and a plurality of servers on the NUT.

16. The TCP session processing method of claim 9, wherein the multiple cores include four cores to 32 cores.

17. A tangible non-transitory computer readable storage media storing computer program instructions that, when executed, cause hardware to support conducting numerous transmission control protocol (TCP) sessions during testing of a network under test (NUT), including:

distributing processing of each TCP session, among the numerous TCP sessions during the testing of the NUT, across multiple cores allocated to TCP session handling, some of the cores sharing a processor die, and each of the cores running a state machine, wherein a first set of cores is allocated to handle TCP session control and a second set of cores is allocated to handle transmission of TCP packets in a session;

each of the state machines running on the cores accessing a shared memory accessible to the first and second sets of cores, that holds protocol control blocks (PCBs) for each of the numerous TCP sessions, wherein the PCBs include state information that is updated by the state machines during set-up of a TCP session;

each of the state machines gaining update access to each of the PCBs by invoking an atomic spinlock processor instruction to secure the update access to a respective PCB in order to proceed with state processing of a part of a respective TCP session; and conducting the numerous TCP sessions during the testing of the NUT.

18. The computer readable storage media of claim 17, wherein the first set of cores allocated to TCP session control further handles starting new streams and establishing a three-way handshake for each new session.

19. The computer readable storage media of claim 17 wherein the PCBs for each of the numerous TCP sessions store unique identifiers of streams, the states of the streams and a unique atomic spinlock for each session to guarantee exclusive access to the PCB that is accessible from the first and second sets of cores.

20. The computer readable storage media of claim 17, wherein the atomic spinlock processor instruction is a processor supported instruction that determines availability of a lock on the PCB and sets the lock in a single clock.

* * * * *